US012374506B2

(12) United States Patent
Li et al.

(10) Patent No.: US 12,374,506 B2
(45) Date of Patent: Jul. 29, 2025

(54) MEMS SWITCH AND METHOD OF MANUFACTURING THE SAME

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Yue Li, Beijing (CN); Yulin Feng, Beijing (CN); Yuelei Xiao, Beijing (CN); Xue Cao, Beijing (CN); Wenbo Chang, Beijing (CN); Kidong Han, Beijing (CN); Yifan Wu, Beijing (CN); Yi Zhou, Beijing (CN); Lihui Wang, Beijing (CN); Qiuxu Wei, Beijing (CN); Qichang An, Beijing (CN); Feng Qu, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/015,696

(22) PCT Filed: Feb. 22, 2022

(86) PCT No.: PCT/CN2022/077225

§ 371 (c)(1),
(2) Date: Jan. 11, 2023

(87) PCT Pub. No.: WO2023/159342

PCT Pub. Date: Aug. 31, 2023

(65) Prior Publication Data

US 2024/0242899 A1 Jul. 18, 2024

(51) Int. Cl.
*H01H 1/00* (2006.01)
*H01H 11/00* (2006.01)

(52) U.S. Cl.
CPC .......... *H01H 1/0036* (2013.01); *H01H 11/00* (2013.01)

(58) Field of Classification Search
CPC ............. H01H 59/0009; H01H 1/0036; H01H 1/0094; H01H 1/20
See application file for complete search history.

(56) References Cited

U.S. PATENT DOCUMENTS 9,748,048 B2 * 8/2017 Fitzgerald .......... H01H 59/0009
2003/0183887 A1 10/2003 Lee et al.
(Continued)

FOREIGN PATENT DOCUMENTS

CN 2658933 Y 11/2004
CN 102280316 A 12/2011
(Continued)

OTHER PUBLICATIONS

First Office Action dated Apr. 14, 2025 corresponding to Chinese application No. 202280000242.3.

*Primary Examiner* — Ahmed M Saeed
(74) *Attorney, Agent, or Firm* — Nath, Goldberg & Meyer; Joshua B. Goldberg

(57) ABSTRACT

A MEMS switch includes an insulating substrate, a driving electrode, a first insulating layer, a first surface of the insulating substrate is provided with a first region, the first region is closer to a surface of the insulating substrate away from the first surface, relative to the first surface, and the driving electrode is on the first region; the first insulating layer completely covers the driving electrode; the first signal transmission line is on a surface of the first insulating layer away from the insulating substrate; and the second signal transmission line includes a signal transmission segment and (Continued)

a cantilever segment connected together as a one-piece member, the signal transmission segment is on the first surface of the insulating substrate, and the cantilever segment is suspended on a side of the first signal transmission line away from the insulating substrate.

20 Claims, 16 Drawing Sheets

(56) References Cited

U.S. PATENT DOCUMENTS

| | | | | |
|---|---|---|---|---|
| 2014/0291136 | A1* | 10/2014 | Shimooka | H01G 5/16<br>200/600 |
| 2019/0222141 | A1* | 7/2019 | Fearing | B25J 9/12 |
| 2020/0309814 | A1* | 10/2020 | Takizawa | G01S 19/49 |

FOREIGN PATENT DOCUMENTS

| | | | |
|---|---|---|---|
| CN | 104037027 | A | 9/2014 |
| JP | 2003243254 | A | 8/2003 |
| KR | 100668614 | B1 | 1/2007 |
| TW | 201003260 | A | 1/2010 |
| TW | 201005782 | A | 2/2010 |

* cited by examiner

MEMS SWITCH AND METHOD OF MANUFACTURING THE SAME

This is a National Phase Application filed under 35 U.S.C. 371 as a national stage of PCT/CN2022/077225, filed Feb. 22, 2022, the content of which is hereby incorporated by reference in its entirety.

TECHNICAL FIELD

The present disclosure relates to the technical field of radio frequency switches, in particular to a Micro-Electro-Mechanical system (MEMS) switch and a method of manufacturing a MEMS switch.

BACKGROUND

With the improvement of microelectronic technology and manufacturing process level, a scale of device processing is continuously reduced, and the trend of miniaturization of mechanical structure and product is obvious. A Micro-Electro-Mechanical system (MEMS) has been developed on such a basis, and combines various disciplines and technologies, realizing the miniaturization development of macro mechanical structures and having great development potential.

With the rapid development of wireless communication technology, the signal frequency is increasing, which requires that the signal transmission component must effectively implement the transmission of signals, thereby placing very high requirements on the radio frequency front-end device. A radio frequency switch is an essential component in radio frequency signal transmission, and mainly controls the switching of multiple circuits and the connection and disconnection of signals. Radio frequency switches currently include mainly an electromechanical switch and a semiconductor switch, where a Micro-Electro-Mechanical system switch (i.e., MEMS switch) is a main representative of miniaturization of the electromechanical switch. In addition to miniaturization of device, a MEMS switch has excellent linearity, low power consumption, and faster switching response speed, compared with other electromechanical switches.

However, a cantilever of the existing MEMS switch is only fixed by an anchor point structure, which not only easily causes the cantilever to deform or fall off from the anchor point structure and deform during use, but also requires a signal to sequentially pass through the anchor point structure and the cantilever from one signal line to another signal line touching the cantilever during transmission, which may cause an increase in contact resistance due to a large number of film layers in contact, thereby causing signal distortion or even disconnection. In addition, for the existing MEMS switch, the anchor point structure needs to be prepared first, and then the cantilever is prepared, so that the process complexity is increased, further, a binding force between the anchor point structure and the cantilever and an effective contact between different membrane layers need to be considered, so that the design is difficult.

SUMMARY

The present disclosure aims to solve at least one technical problem in the prior art and provides a MEMS switch and a method of manufacturing the same, which can not only simplify the structure of the switch and reduce the complexity of the process, thereby reducing the loss and distortion of signals during transmission, but also reduce the probability of deformation and breakage of the cantilever and improve the reliability of the cantilever.

In order to achieve the above object, the present disclosure provides a MEMS switch, including an insulating substrate, a driving electrode, a first insulating layer, a first signal transmission line and a second signal transmission line, where a first surface of the insulating substrate is provided with a first region, the first region is closer to a surface of the insulating substrate away from the first surface, relative to the first surface, and the driving electrode is on the first region;

the first insulating layer completely covers the driving electrode;

the first signal transmission line is on a surface of the first insulating layer away from the insulating substrate; and the second signal transmission line includes a signal transmission segment and a cantilever segment connected together as a one-piece member, where the signal transmission segment is on the first surface of the insulating substrate, and the cantilever segment is suspended on a side of the first signal transmission line away from the insulating substrate.

Optionally, a surface of the signal transmission segment close to the insulating substrate and a surface of the cantilever segment close to the insulating substrate are flush with each other, and a thickness of the signal transmission segment is the same as a thickness of the cantilever segment.

Optionally, the insulating substrate includes a glass substrate.

Optionally, the MEMS switch further includes a touch point structure on the first region, where the first insulating layer completely covers the touch point structure, and an orthographic projection of the first signal transmission line on the first region at least partially covers an orthographic projection of the touch point structure on the first region.

Optionally, the touch point structure and the insulating substrate are connected together as a one-piece member.

Optionally, the first insulating layer further covers the first surface of the insulating substrate, a side surface connected between the first region and the first surface, and an exposed region in the first region, and the first insulating layer is on a side of the signal transmission segment close to the insulating substrate; or the first insulating layer further covers the side surface and the exposed region in the first region; or the first insulating layer further covers the exposed region in the first region.

Optionally, the MEMS switch further includes a second insulating layer disposed on the first region, where the driving electrode is on a surface of the second insulating layer away from the insulating substrate; and the first insulating layer is on a side of the second insulating layer away from the insulating substrate.

Optionally, the second insulating layer completely covers the first surface of the insulating substrate, a side surface connected between the first region and the first surface, and the first region, and the second insulating layer is on a side of the signal transmission segment close to the insulating substrate; or the second insulating layer completely covers the side surface and the first region; or the second insulating layer completely covers the first region.

Optionally, the MEMS switch further includes an elastic layer, where the elastic layer is on a surface of the signal transmission segment away from the insulating substrate and a surface of the cantilever segment away from the insulating substrate; or the elastic layer is on the surface of the cantilever segment away from the insulating substrate.

Optionally, the elastic layer includes graphene.

Optionally, the cantilever segment is provided with a plurality of through holes penetrating through the cantilever segment in a thickness direction of the cantilever segment.

As another technical solution, the present disclosure further provides a method of manufacturing a MEMS switch, including:

forming a first region at a first surface of an insulating substrate, remaining the first surface except the first region, where the first region is closer to a surface of the insulating substrate away from the first surface, relative to the first surface;

forming a driving electrode on the first region;

forming a first insulating layer, where the first insulating layer completely covers the driving electrode;

forming a first signal transmission line on a surface of the first insulating layer away from the insulating substrate;

forming a sacrificial layer on the first region, where a surface of the sacrificial layer away from the first region and the first surface of the insulating substrate are flush with each other;

forming a second signal transmission line on the first surface of the insulating substrate and the surface of the sacrificial layer away from the first region, where the second signal transmission line includes a signal transmission segment and a cantilever segment connected together as a one-piece member, the signal transmission segment is on the first surface of the insulating substrate, and the cantilever segment is on the surface of the sacrificial layer away from the first region; and removing the sacrificial layer, such that the cantilever segment is suspended on a side of the first signal transmission line away from the touch point structure.

Optionally, before forming the driving electrode on the first region, the manufacturing method further includes:

forming a touch point structure on the first region;

where the first region and the touch point structure are formed in a same step; or the first region and the touch point structure are formed successively in two steps;

in the forming the first insulating layer, the first insulating layer completely covers the touch point structure; and in the forming the first signal transmission line, an orthographic projection of the first signal transmission line on the first region at least partially covers an orthographic projection of the touch point structure on the first region.

Optionally, when forming the first region and the touch point structure in the same step, the first region and the touch point structure are formed through etching using a laser etching method.

Optionally, after the forming the first region at the first surface of the insulating substrate and before the forming the driving electrode on the first region, the method further includes:

forming a second insulating layer;

where the second insulating layer completely covers the first surface of the insulating substrate, a side surface connected between the first region and the first surface, and the first region; or the second insulating layer completely covers the side surface and the first region; or the second insulating layer completely covers the first region.

Optionally, the sacrificial layer is removed by plasma etching or acid-base etching.

Optionally, after the forming the second signal transmission line and before the removing the sacrificial layer, the manufacturing method further includes:

forming an elastic layer on a surface of the signal transmission segment away from the insulating substrate and a surface of the cantilever segment away from the insulating substrate; or forming the elastic layer on the surface of the cantilever segment away from the insulating substrate.

DETAIL DESCRIPTION OF EMBODIMENTS

Figure 1:
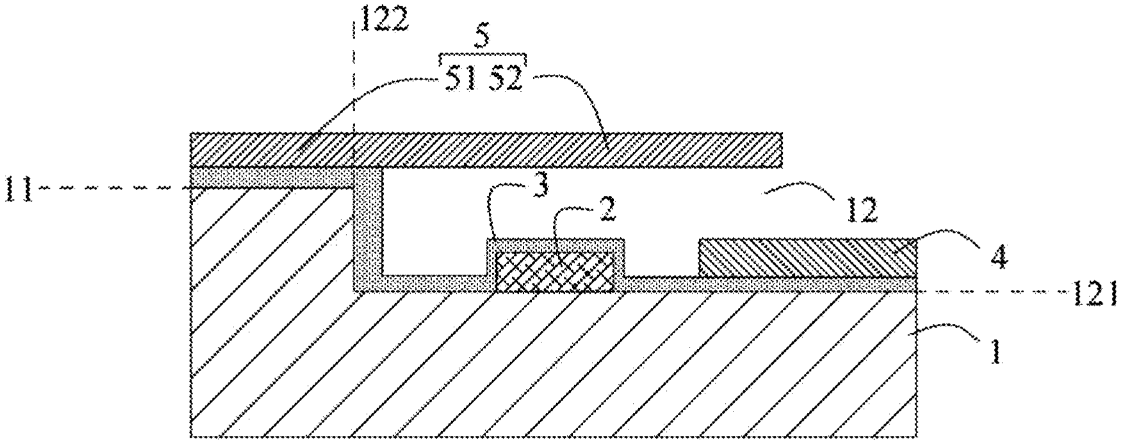
FIG. 1 is a first cross-sectional view of a MEMS switch provided by an embodiment of the present disclosure.

In order to make the objects, technical solutions and advantages of the present disclosure more apparent, the present disclosure will be described in further detail below with reference to the accompanying drawings, and it is apparent that the described embodiments are only some embodiments of the present disclosure, not all embodiments. All other embodiments, which can be derived by a person skilled in the art from the embodiments disclosed herein without making any creative effort, shall fall within the protection scope of the present disclosure.

The shapes and sizes of the components in the drawings are not drawn to scale, but are merely intended to facilitate an understanding of the contents of the embodiments of the present disclosure.

Unless defined otherwise, technical or scientific terms used herein shall have the ordinary meaning as understood by one of ordinary skill in the art to which this disclosure belongs. The use of "first", "second", and the like in the present disclosure is not intended to indicate any order, quantity, or importance, but rather serves to distinguish one element from another. Also, the term "a", "an", "the" or the like does not denote a limitation of quantity, but rather denotes the presence of at least one. The word "comprising", "comprises", or the like means that the element or item preceding the word includes the element or item listed after the word and its equivalent, but does not exclude other elements or items. The term "connected", "coupled" or the like is not restricted to physical or mechanical connections, but may include electrical connections, whether direct or indirect. The terms "upper", "lower", "left", "right", and the like are used only to indicate relative positional relationships, and when the absolute position of the object being described is changed, the relative positional relationships may also be changed accordingly.

The embodiments of the present disclosure are not limited to the embodiments shown in the drawings, but include modifications of configurations formed based on a manufacturing process. Thus, the regions illustrated in the figures have schematic properties, and the shapes of the regions shown in the figures illustrate specific shapes of regions of elements, but are not intended to be limiting.

FIG. 1 is a first cross-sectional view of a MEMS switch provided by an embodiment of the present disclosure. Referring to FIG. 1, a MEMS switch is an abbreviation of a Micro-Electro-Mechanical System switch, which is an essential component in radio frequency signal transmission and mainly controls switching of multiple circuits and conduction and break of a signal. The MEMS switch includes an insulating substrate 1, a driving electrode 2, a first insulating layer 3, a first signal transmission line 4, and a second signal transmission line 5. The insulating substrate 1 is made of an insulating material, preferably a glass substrate, which has a high resistivity (generally over 100 S/m) and a low dielectric loss (0.004), and is helpful to reduce contact resistance during signal transmission compared to a semiconductor substrate (e.g., a silicon substrate, which has a resistivity of 0.1 S/m and a dielectric loss of 0.02) in the prior art, so as to reduce loss and distortion of signals during transmission. Alternatively, in practical applications, other insulating materials may also be adopted, which are not particularly limited in the embodiment of the present disclosure.

In some alternative embodiments, in order to adapt to small-scale production, a thickness of the insulating substrate 1 may be greater than or equal to 0.3 mm and less than or equal to 0.7 mm.

A first surface 11 of the insulating substrate 1 is provided with a first region 121, and the first region 121 is closer to a surface of the insulating substrate 1 away from the first surface 11 relative to the first surface 11. That is, there is a height difference between the first surface 11 (other regions except the first region 121) and the first region 121, forming a step structure 12, and the step structure 12 is used for accommodating the driving electrode 2 and the first signal transmission line 4 and providing a sufficient height difference for suspension of the second signal transmission line 5. Specifically, the driving electrode 2 is disposed in the first region 121; a thickness of the driving electrode 2 may be greater than or equal to 3 μm and less than or equal to 10 μm. The first insulating layer 3 completely covers the driving electrode 2, and is used for protecting the driving electrode 2 and improving the structural stability of the driving electrode 2. A material of the first insulating layer 3 may be silicon nitride, silicon oxide, tantalum nitride, or the like. A thickness of the first insulating layer 3 may be greater than or equal to 0.1 μm and less than or equal to 3 μm. As shown in FIG. 1, the first insulating layer 3 may further cover the first surface 11 of the insulating substrate 1, a side surface 122 connected between the first region 121 and the first surface 11, and an exposed region (a region not covered by the driving electrode 2) in the first region 121, on the basis of covering the driving electrode 2. Through covering the first surface 11 of the insulating substrate 1, the side surface 122, and the exposed region in the first region 121 by the first insulating layer 3, it is possible not only to reduce the surface roughness of the insulating substrate 1 but also to reduce the dielectric loss of the insulating substrate 1, so that the loss and distortion of signals during transmission can be further reduced.

The first signal transmission line 4 is disposed on a surface of the first insulating layer 3 away from the insulating substrate 1, and as shown in FIG. 1, the first signal transmission line 4 may be disposed in an even thickness. The first signal transmission line 4 and the second signal transmission line 5 may each be made of metal such as gold, silver, aluminum, titanium, tungsten, or the like. The second signal transmission line 5 includes a signal transmission segment 51 and a cantilever segment 52 connected together as a one-piece member, the signal transmission segment 51 is disposed on the first surface 11 of the insulating substrate 1, and the cantilever segment 52 is suspended on a side of the first signal transmission line 4 away from the insulating substrate 1. Specifically, the cantilever segment 52 extends from an edge of the first surface 11 of the insulating substrate 1 to an inner side of the side surface 122, and an orthographic projection of the cantilever segment 52 on the first region 121 overlaps an orthographic projection of the first signal transmission line 4 on the first region 121, so that the cantilever segment 52 may descend and touch the first signal transmission line 4 when being subjected to an electrostatic attraction force. The term "suspension" means that when the cantilever segment 52 is not subjected to the electrostatic attraction force, an end of the cantilever segment 52 close to the first signal transmission line 4 is a free end. In practical applications, an thickness of the first signal transmission line 4 and the height difference between the first surface 11 and the first region 121 may be set according to specific requirements, as long as the cantilever segment 52 of the second signal transmission line 5 may be ensured to touch the first signal transmission line 4 when descending. Optionally, the height difference between the first surface 11 and the first region 121 is, for example, greater than or equal to 1 μm and less than or equal to 8 μm. In addition, a size of an inner space of the step structure 12 may be set according to the sizes of the driving electrode 2 and the first signal transmission line 4. For example, a size of the first region 121 parallel to a width direction of the first signal transmission line 4 may be greater than or equal to 80 μm and less than or equal to 700 μm.

It should be noted that, in practical applications, the number, the position and the arrangement of the first regions 121 on the insulating substrate 1 may be set according to the number, the position and the arrangement of the switch structures (including but not limited to the driving electrode 2, the first signal transmission line 4 and the second signal transmission line 5) actually disposed on the insulating substrate 1. In the embodiment of the present disclosure only one of the first regions 121 on the insulating substrate 1 and the switch structure corresponding to this first region 121 are exemplarily illustrated.

Figure 15:
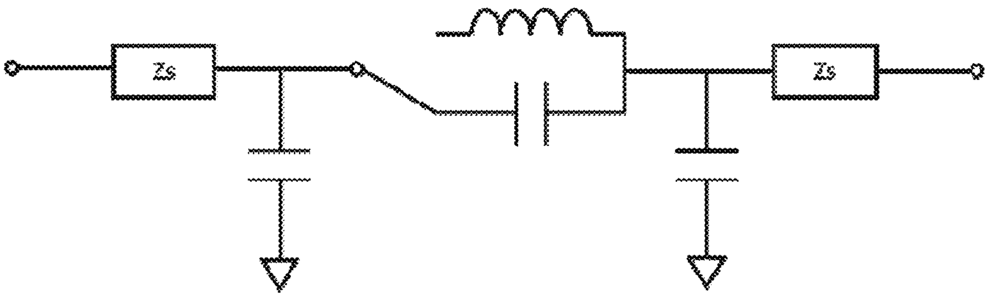
FIG. 15 is a schematic diagram of an equivalent circuit of a MEMS switch in a first state provided by an embodiment of the present disclosure.
Figure 16:
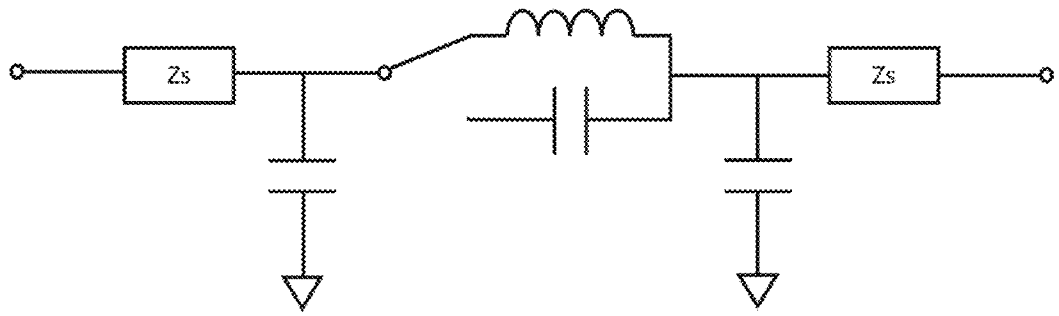
FIG. 16 is a schematic diagram of an equivalent circuit of a MEMS switch in a second state provided by an embodiment of the present disclosure.

FIG. 15 is a schematic diagram of an equivalent circuit of a MEMS switch in a first state provided by an embodiment of the present disclosure. As shown in FIG. 15, when the cantilever segment 52 is not subjected to the electrostatic attraction force, the end of the cantilever segment close to the first signal transmission line 4 is the free end and does not touch the first signal transmission line 4. In this case, it is equivalent that the first signal transmission line 4 is connected to a capacitor, the MEMS switch is in a turned-off state, and the signal transmission is blocked. FIG. 16 is a schematic diagram of an equivalent circuit of a MEMS switch in a second state provided by an embodiment of the present disclosure. As shown in FIG. 16, when the cantilever segment 52 is subjected to an electrostatic attraction force, the end of the cantilever segment close to the first signal transmission line 4 descends and touches the first signal transmission line 4. In this case, it is equivalent that the first signal transmission line 4 is connected to an inductor, so that a circuit between two resistors Zs is closed, the MEMS switch is in a turned-on state, and a signal can be effectively transmitted.

In the MEMS switch provided by the embodiment of the present disclosure, the second signal transmission line 5 includes the signal transmission segment 51 and the cantilever segment 52 connected together as a one-piece member, in other words, the cantilever segment 52 and the signal transmission segment 51 are integrally formed, meanwhile the suspension of the cantilever segments 52 is achieved by means of the height difference between the first surface 11 and the first region 121, so that compared with the prior art, an anchor point structure between the cantilever and the signal line and the preparation steps thereof are omitted, thereby not only simplifying the structure of the switch and reducing the complexity of the process, but also being able to reduce the impedance at the connection of the cantilever and the signal line (i.e., the cantilever segment 52 and the signal transmission segment 51), and to reduce the loss and distortion of the signal during transmission, and the signal transmission segment 51 and the cantilever segment 52 connected together as a one-piece member have stronger bonding force, thereby reducing the probability of deformation and breakage of the cantilever, and improving the reliability of the cantilever.

In an alternative embodiment, as shown in FIG. 1, a surface of the signal transmission segment 51 close to the insulating substrate 1 and a surface of the cantilever segment 52 close to the insulating substrate 1 are flush with each other, and thicknesses of the signal transmission segment 51 and the cantilever segment 52 are the same. In this way, the cantilever segment 52 and the signal transmission segment 51 are integrally formed, so that the process difficulty can be further simplified.

Figure 2:
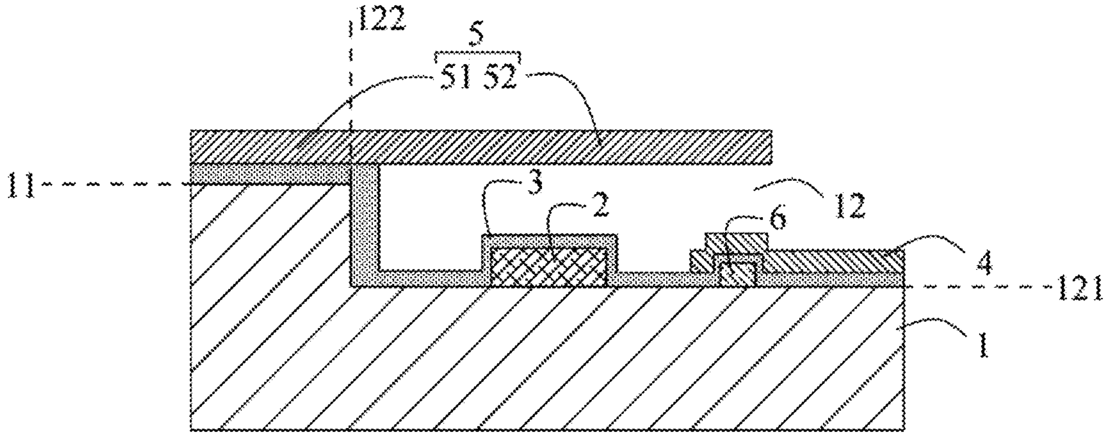
FIG. 2 is a second cross-sectional view of a MEMS switch provided by an embodiment of the present disclosure.

FIG. 2 is a second cross-sectional view of a MEMS switch provided by an embodiment of the present disclosure. In another alternative embodiment, as shown in FIG. 2, the MEMS switch further includes a touch point structure 6, and the touch point structure 6 is disposed on the first region 121, and specifically may be a convex part formed on the first region 121. In this case, the first insulating layer 3 further completely covers the touch point structure 6 on the basis of covering the driving electrode 2, to protect the driving electrode 2 and the touch point structure 6, and improve the structural stability of the driving electrode 2 and the touch point structure 6. Furthermore, an orthographic projection of the first signal transmission line 4 on the first region 121 completely covers an orthographic projection of the touch point structure 6 on the first region 121, so that the first signal transmission line 4 forms a protrusion at the position corresponding to the touch point structure 6, thereby facilitating the touch between the first signal transmission line 4 and the cantilever segment 52. Alternatively, in practical applications, the orthographic projection of the first signal transmission line 4 on the first region 121 may partially cover the orthographic projection of the touch point structure 6 on the first region 121, as long as the first signal transmission line 4 may form a protrusion at the position corresponding to the touch point structure 6.

A material of the touch point structure 6 may be an insulating material, such as silicon nitride. A thickness of the touch point structure 6 may be greater than or equal to 1 μm, and less than or equal to 5 μm.

As shown in FIG. 2, the touch point structure 6 is of a separate structure from the insulating substrate 1, and the touch point structure 6 is formed on the first region 121, for example, through deposition and etching. In order to further reduce the process complexity, in another alternative embodiment, as shown in FIG. 3, the touch point structure 6 and the insulating substrate 1 are connected together as a one-piece member, for example, the first region 121 and the touch point structure 6 may be formed through etching in a same step using a laser etching method, so that the process steps can be reduced, and the process cost can be reduced.

Figure 3:
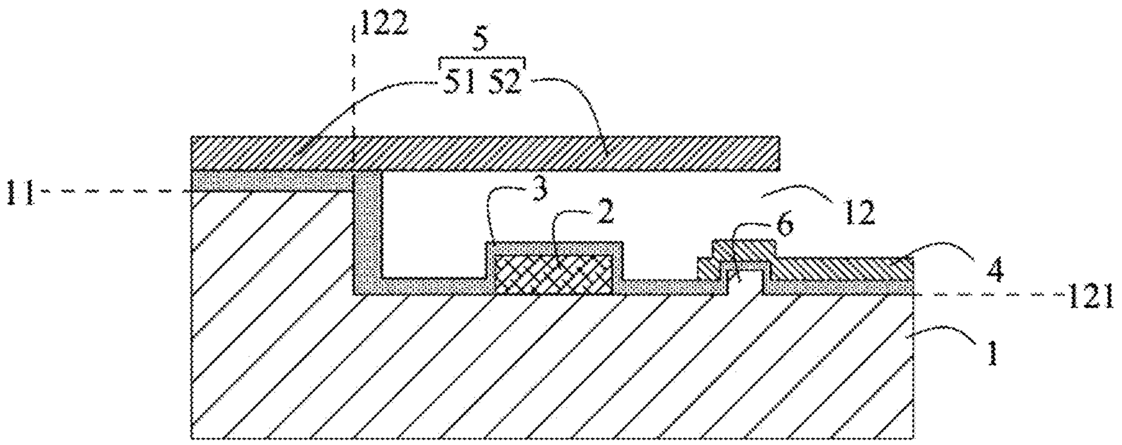
FIG. 3 is a third cross-sectional view of a MEMS switch provided by an embodiment of the present disclosure.
Figure 4:
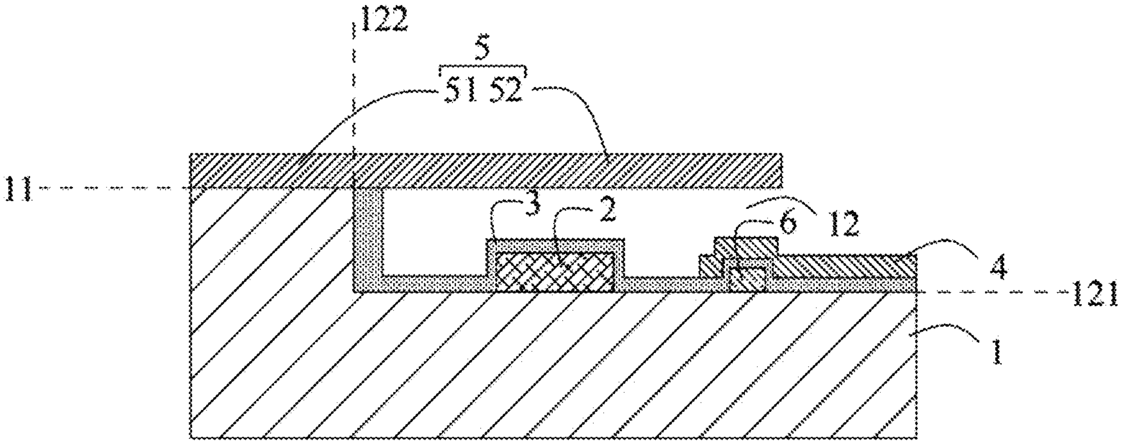
FIG. 4 is a fourth cross-sectional view of a MEMS switch provided by an embodiment of the present disclosure.
Figure 5:
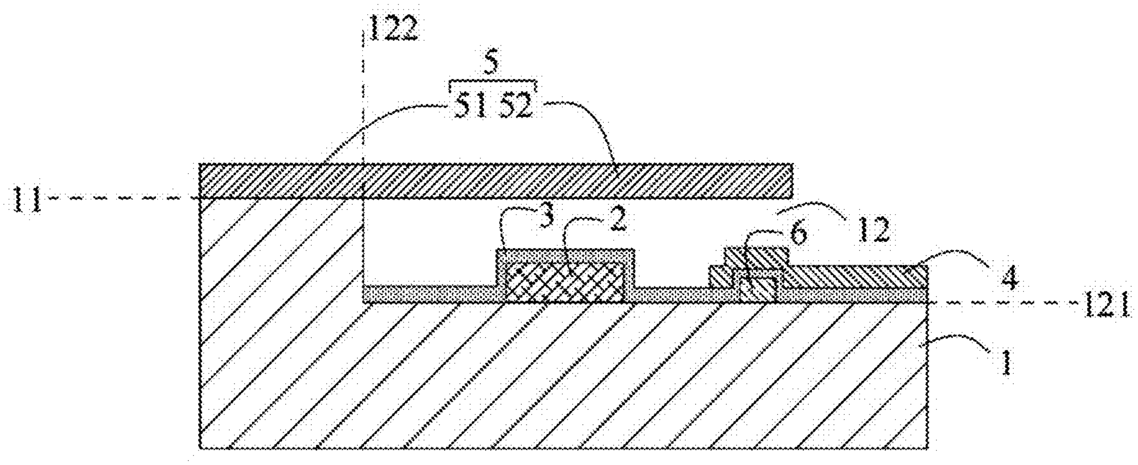
FIG. 5 is a fifth cross-sectional view of a MEMS switch provided by an embodiment of the present disclosure.

In the MEMS switch shown in FIGS. 1, 2 and 3, the first insulating layer 3 may further cover the first surface 11 of the insulating substrate 1, the side surface 122 and the exposed regions in the first region 121, on the basis of covering the driving electrode 2 or covering the driving electrode 2 and the touch point structure 6. However, the embodiment of the present disclosure is not limited thereto. For example, as shown in FIG. 4, the first insulating layer 3 may further cover the side surface 122 and the exposed region in the first region 121, on the basis of covering the driving electrode 2 or covering the driving electrode 2 and the touch point structure 6, i.e., the first surface 11 of the insulating substrate 1 is not covered by the first insulating layer 3. As another example, as shown in FIG. 5, the first insulating layer 3 may further cover the exposed region in the first region 121, i.e., the first surface 11 of the insulating substrate 1 and the side surface 122 are not covered by the first insulating layer 3. Both structures of the first insulating layer 3 shown in FIGS. 4 and 5 are applicable to any one of the MEMS switches shown in FIGS. 1, 2, and 3. It should be noted that, in the case where the first insulating layer 3 covers the first surface 11 of the insulating substrate 1, the first insulating layer 3 is located on a side of the signal transmission segment 51 close to the insulating substrate 1.

Figure 6:
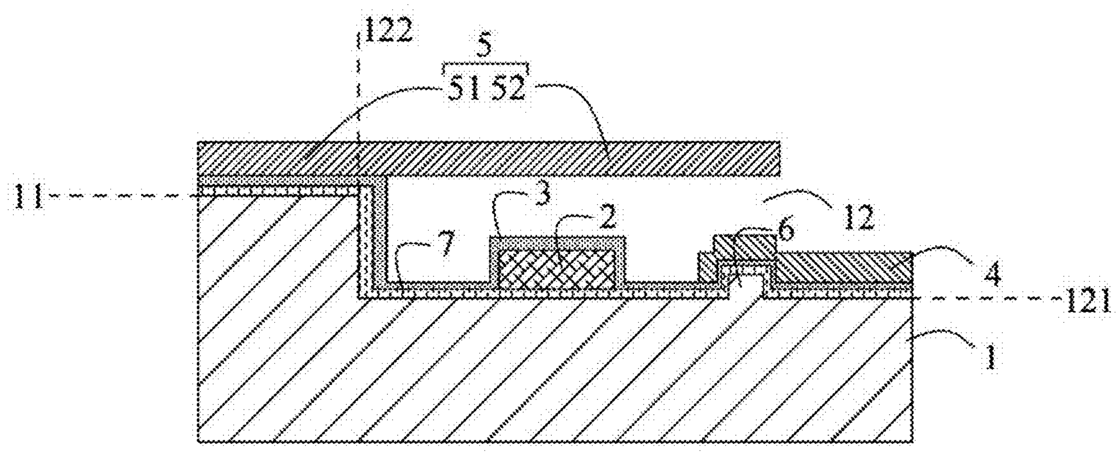
FIG. 6 is a sixth cross-sectional view of a MEMS switch provided by an embodiment of the present disclosure.

FIG. 6 is a sixth cross-sectional view of a MEMS switch provided by an embodiment of the present disclosure. As shown in FIG. 6, on the basis of the MEMS switch shown in FIG. 3, the MEMS switch further includes a second insulating layer 7 disposed in the first region 121. Specifically, the second insulating layer 7 completely covers the first surface 11 of the insulating substrate 1, the side surface 122 and the first region 121, and the second insulating layer 7 is located on a side of the first insulating layer 3 close to the insulating substrate 1. A material of the second insulating layer 7 may be silicon nitride, silicon oxide, tantalum nitride, or the like. A thickness of the second insulating layer 7 may be greater than or equal to 0.1 μm and less than or equal to 3 μm. By means of the second insulating layer 7, not only the surface roughness of the insulating substrate 1 can be reduced, but also the dielectric loss of the insulating substrate 1 can be reduced, so that the loss and distortion of signals during transmission can be further reduced. The driving electrode 2 is arranged on a surface of the second insulating layer 7 away from the insulating substrate 1. The first insulating layer 3 is located on a side of the second insulating layer 7 away from the insulating substrate 1.

Figure 7:
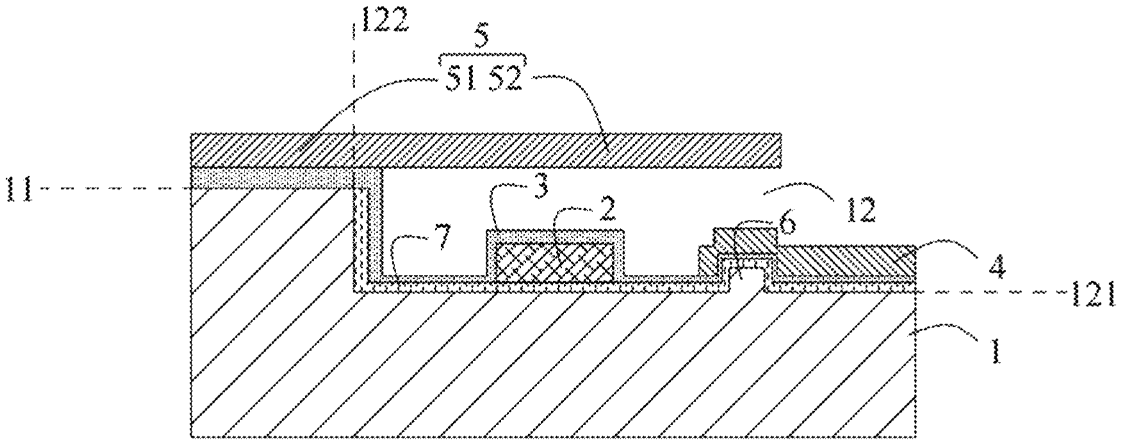
FIG. 7 is a seventh cross-sectional view of a MEMS switch provided by an embodiment of the present disclosure.
Figure 8:
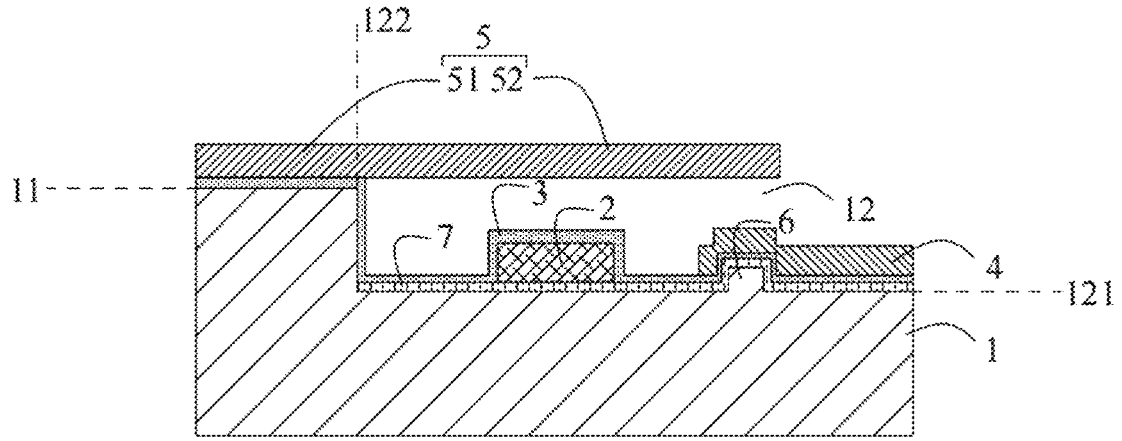
FIG. 8 is an eighth cross-sectional view of a MEMS switch provided by an embodiment of the present disclosure.

The second insulating layer 7 shown in FIG. 6 completely covers the first surface 11 of the insulating substrate 1, the side surface 122 and the first region 121, but the embodiment of the present disclosure is not limited thereto. For example, as shown in FIG. 7, the second insulating layer 7 may alternatively completely cover only the side surface 122 and the first region 121, but not cover the first surface 11 of the insulating substrate 1. As another example, as shown in FIG. 8, the second insulating layer 7 may alternatively completely cover only the first region 121, but not cover the first surface 11 of the insulating substrate 1 and the side surface 122. The three structures of the second insulating layer 7 shown in FIGS. 6, 7 and 8 are all applicable to any one of the MEMS switches shown in FIGS. 1 to 5. It should be noted that, in the case where the touch point structure 6 and the insulating substrate 1 are connected together as a one-piece member, as shown in FIG. 6, the second insulating layer 7 covers the touch point structure 6. In the case where the touch point structure 6 and the insulating substrate 1 adopt the separate structure as shown in FIG. 2, the second insulating layer 7 may be located on a side of the touch point structure 6 close to the insulating substrate 1, or the second insulating layer 7 may cover the touch point structure 6.

Figure 9:
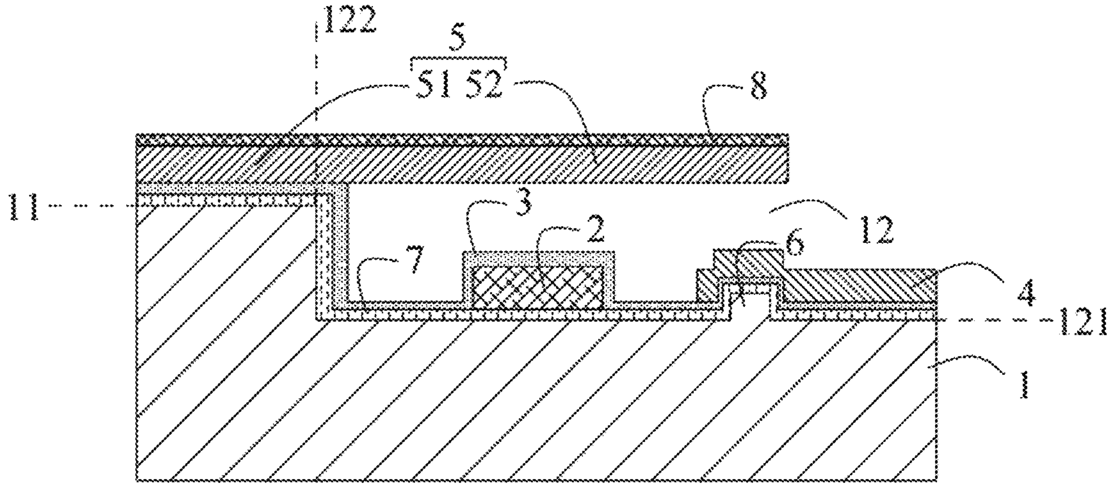
FIG. 9 is a ninth cross-sectional view of a MEMS switch provided by an embodiment of the present disclosure.

FIG. 9 is a ninth cross-sectional view of a MEMS switch provided by an embodiment of the present disclosure. As shown in FIG. 9, on the basis of any one of the MEMS switches shown in FIGS. 1 to 8, the MEMS switch further includes an elastic layer 8, and the elastic layer 8 is disposed on a surface of the signal transmission segment 51 away from the insulating substrate 1 and a surface of the cantilever segment 52 away from the insulating substrate 1. A material of the elastic layer 8 is, for example, an elastic material such as graphene. By means of the elastic layer 8, the elastic coefficient of the cantilever segment 52 can be effectively improved. When the cantilever segment 52 bends downward, the cantilever segment 52 may be pulled upward by the tensile stress of the elastic layer 8, so that the adhesion between the first signal transmission line 4 and the cantilever segment 52 can be reduced, and the reliability of the MEMS switch can be improved. It should be noted that, in practical applications, the elastic layer 8 may alternatively be disposed only on a surface of the cantilever segment 52 away from the insulating substrate 1, as long as the above functions can be achieved, which is not particularly limited by the embodiment of the present disclosure.

In some alternative embodiments, the cantilever segment 52 is provided with a plurality of through holes (not shown) penetrating through the cantilever segment 52 in a thickness direction of the cantilever segment 52. In manufacturing the second signal transmission line 5, one method is to fill the step structure 12 with a sacrificial layer to planarize the entire surface of the insulating substrate 1 (including the first surface 11 and the surface of the sacrificial layer away from the first region 121 of the step structure 12), and remove the sacrificial layer after the second signal transmission line 5 is formed. The through hole is used, so that the sacrificial layer is more easier to be released when the step of removing the sacrificial layer is performed. Optionally, the through holes are arranged in an array. In practical application, the size and the interval of through holes may be adjusted according to the requirements on process. Taking the through hole being circular as an example, and the diameter of through hole may be more than or equal to 5 μm and less than or equal to 20 μm, and the interval between two adjacent through holes is more than or equal to 10 μm and less than or equal to 50 μm. Alternatively, the through hole may be of any other shape, such as a square, a rectangle, etc., which is not particularly limited in the embodiment of the present disclosure.

Figure 10:
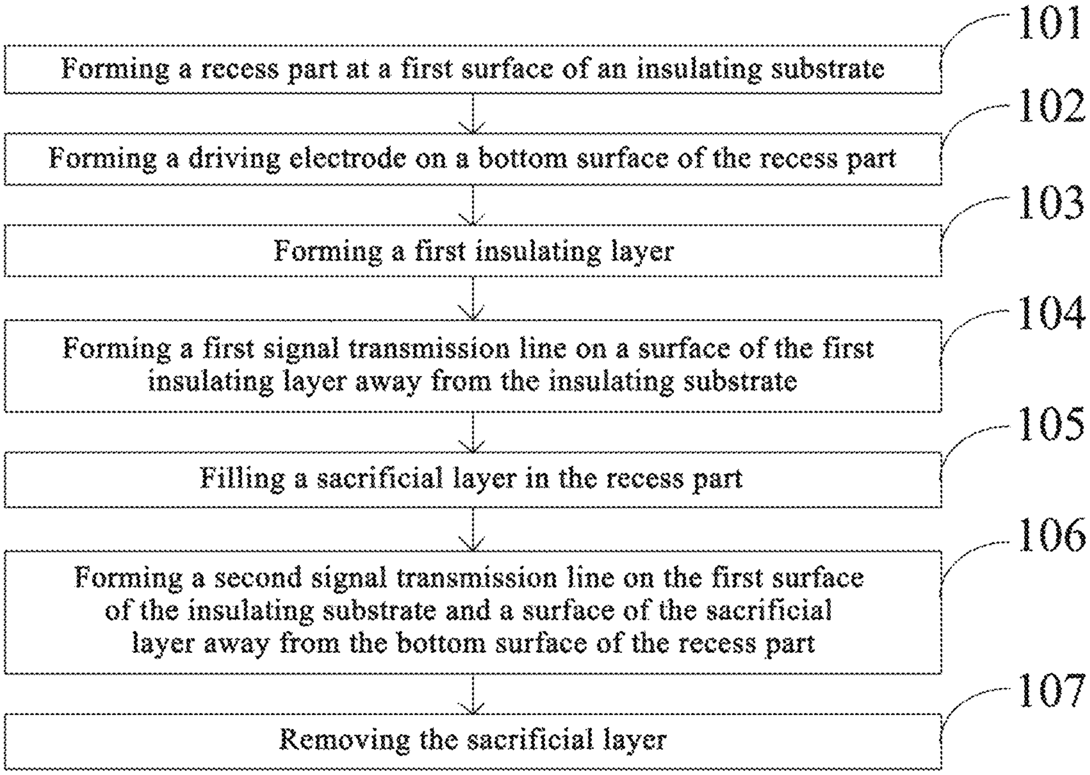
FIG. 10 is a first flowchart of a method of manufacturing a MEMS switch provided by an embodiment of the present disclosure.

As another technical solution, an embodiment of the present disclosure further provides a method of manufacturing a MEMS switch. FIG. 10 is a first flowchart of a method of manufacturing a MEMS switch provided by an embodiment of the present disclosure. Referring to FIG. 10, taking a method of manufacturing the MEMS switch shown in FIG. 1 as an example, the manufacturing method includes the following steps.

Step 101, forming a first region 121 at a first surface 11 of an insulating substrate 1, where the first region 121 is closer to a surface of the insulating substrate 1 away from the first surface 11, relative to the first surface 11. That is, there is a height difference between the first surface 11 (other regions except the first region 121) and the first region 121.

In some alternative embodiments, before performing step 101, ultrasonic cleaning is performed on the insulating substrate 1 to remove impurities on the surface of the insulating substrate 1. Specifically, the ultrasonic cleaning process is to sequentially soak the insulating substrate 1 in deionized water, ethanol, and isopropanol, simultaneously performing ultrasonic (oscillation) cleaning. The duration for cleaning is, for example, 20 min.

In step 101, the glass substrate 1 may be patterned and etched using a laser to form the first regions 121 on the insulating substrate 1. The number, the position, and the arrangement of the first regions 121 may be set according to the number, the position, and the arrangement of the switch structures (including but not limited to the driving electrodes 2, the first signal transmission lines 4, and the second signal transmission lines 5) actually disposed on the insulating substrate 1.

Step 102, forming a driving electrode 2 in the first region 121;

In step 102, the preparation of the driving electrode 2 may be completed through processes such as metal line plating, photoresist spin coating, pattern exposing and etching, and the like.

Step 103, forming a first insulating layer 3, where the first insulating layer 3 completely covers the driving electrode 2;

In step 103, the first insulating layer 3 may be prepared by Physical Vapor Deposition (PVD), Chemical Vapor Deposition (CVD), or the like.

Step 104, forming a first signal transmission line 4 on a surface of the first insulating layer 3 away from the insulating substrate 1;

In step 104, the preparation of the first signal transmission line 4 may be completed through processes such as signal line plating, photoresist spin coating, pattern exposing and etching, and the like.

Step 105, forming a sacrificial layer on the first region 121, where a surface of the sacrificial layer away from the first region 121 of the step structure 12 is flush with the first surface 11 of the insulating substrate 1;

The sacrificial layer fills in the step structure 12, and may planarize the entire surface of the insulating substrate 1 (including the first surface 11 and a surface of the sacrificial layer away from the first region 121 of the step structure 12), so that the signal transmission segment 51 and the cantilever segment 52 of the second signal transmission line 5, which are connected together as a one-piece member, may be formed in a subsequent step.

The sacrificial layer may be made of an organic material, such as polyimide (PI), photoresist, or an inorganic material, such as polysilicon, phosphosilicate glass, or the like. The sacrificial layer of the organic material may be prepared by spin coating, and a high planarization of the entire surface of the insulating substrate 1 may be achieved by precisely controlling the rotation speed of a spin coating tool and the total amount of the dropped solution during the preparation. The sacrificial layer of an inorganic material may be prepared by a CVD or PVD method, and a high planarization of the entire surface of the insulating substrate 1 is achieved by precisely controlling the film thickness during the preparation.

Step 106, forming a second signal transmission line 5 on the first surface 11 of the insulating substrate 1 and the surface of the sacrificial layer away from the first region 121, where the second signal transmission line 5 includes a signal transmission segment 51 and a cantilever segment 52 connected together as a one-piece member, the signal transmission segment 51 is disposed on the first surface 11 of the insulating substrate 1, and the cantilever segment 52 is disposed on the surface of the sacrificial layer away from the first region 121.

In step 106, the signal transmission segment 51 and the cantilever segment 52, which are connected together as a one-piece member, may be formed by metal plating, photoresist spin coating, pattern exposing and etching, and the like.

In some alternative embodiments, in step 106, a plurality of through holes penetrating through the cantilever segment 52 in the thickness direction of the cantilever segment 52 may be further formed. The through hole is used for facilitating the release of the sacrificial layer when the step of removing the sacrificial layer is performed later.

Step 107, removing the sacrificial layer, so that the cantilever segment 52 is suspended on a side of the first signal transmission line 4 away from the touch point structure 6.

In step 107, the sacrificial layer may be removed by plasma etching or acid-base etching.

In the method of manufacturing the MEMS switch provided by the embodiment of the present disclosure, the signal transmission segment 51 and the cantilever segment 52, which are connected together as a one-piece member, are formed in a same step (i.e., step 106), in other words, the cantilever segment 52 and the signal transmission segment 51 are integrally formed, meanwhile the suspension of the cantilever segments 52 is achieved by means of the height difference between the first surface 11 and the first region 121, so that compared with the prior art, an anchor point structure between the cantilever and the signal line and the preparation steps thereof are omitted, thereby not only simplifying the structure of the switch and reducing the complexity of the process, but also being able to reduce the impedance at the connection of the cantilever and the signal line (i.e., the cantilever segment 52 and the signal transmission segment 51), and to reduce the loss and distortion of the signal during transmission, and the signal transmission segment 51 and the cantilever segment 52 connected together as a one-piece member have stronger bonding force, thereby reducing the probability of deformation and breakage of the cantilever, and improving the reliability of the cantilever.

Figure 11:
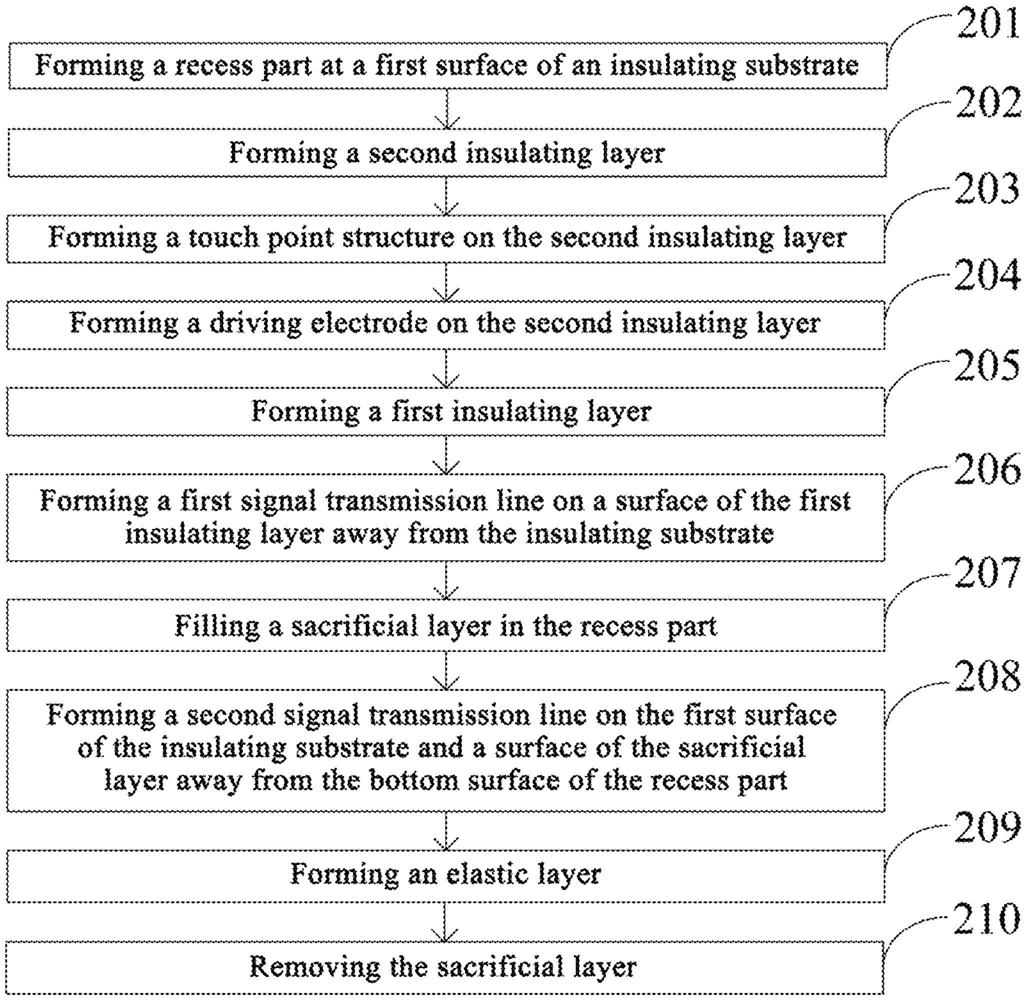
FIG. 11 is a second flowchart of a method of manufacturing a MEMS switch provided by an embodiment of the present disclosure.
Figure 12A:
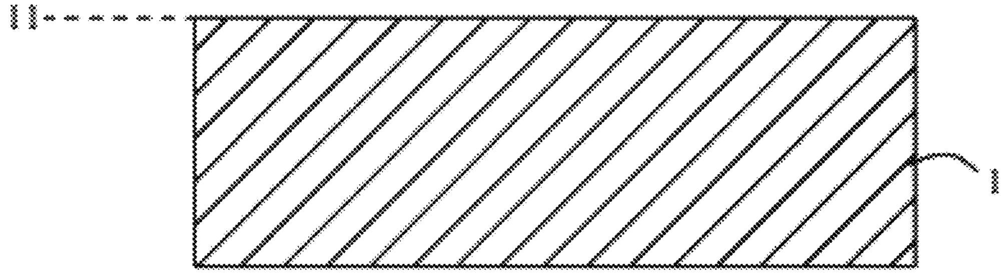
FIG. 12A shows an insulating substrate having a first surface.

On the basis of the method of manufacturing the MEMS switch shown in FIG. 10, the manufacturing method may be further modified. Specifically, FIG. 11 is a second flowchart of a method of manufacturing a MEMS switch provided by an embodiment of the present disclosure. FIGS. 12A to 12K show a second process diagram of a method of manufacturing a MEMS switch provided by an embodiment of the present disclosure. Referring to FIGS. 11 and 12A, an insulating substrate 1 is provided. As shown in FIG. 12A, the insulating substrate 1 has a first surface 11.

The manufacturing method includes the following steps.

Figure 12B:
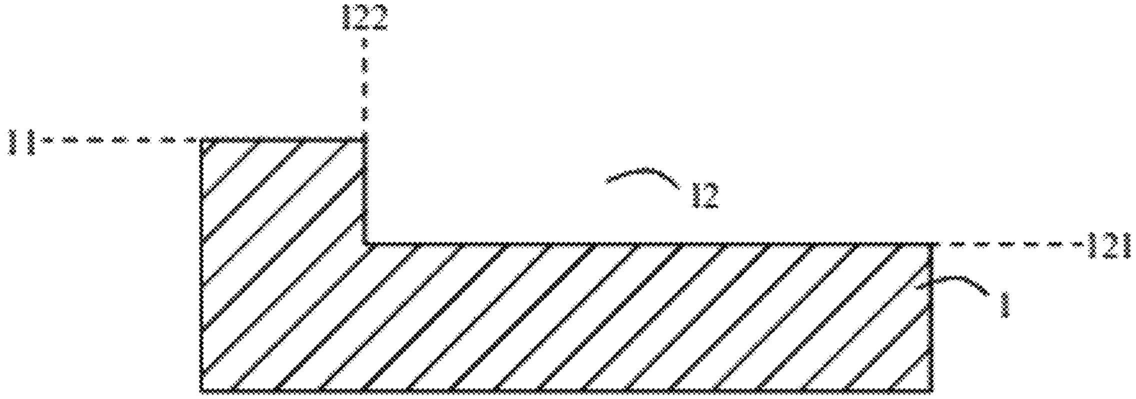
FIG. 12B shows step 201 in a second process diagram of a method of manufacturing a MEMS switch provided by an embodiment of the present disclosure.

Step 201, as shown in FIG. 12B, forming a first region 121 at the first surface 11 of the insulating substrate 1, where the first region 121 is closer to a surface of the insulating substrate 1 away from the first surface 11, relative to the first surface 11. That is, there is a height difference between the first surface 11 (other regions except the first region 121) and the first region 121.

Figure 12C:
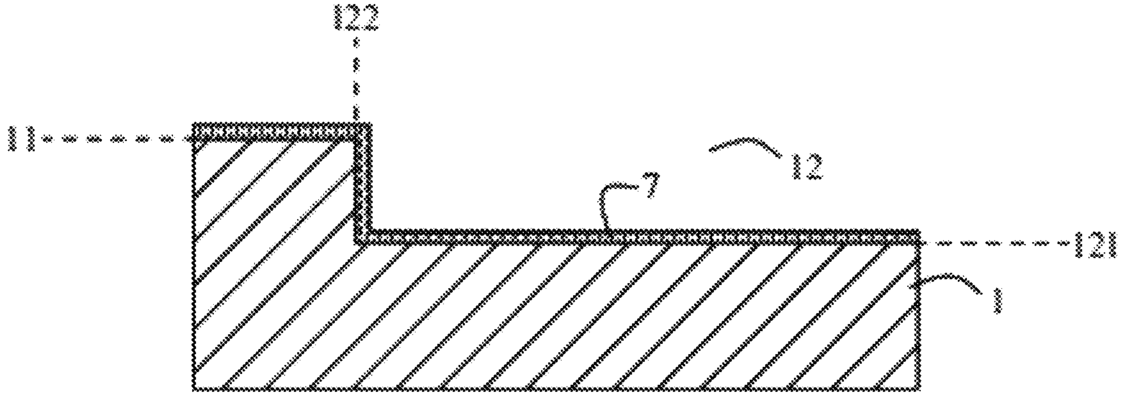
FIG. 12C shows step 202 in a second process diagram of a method of manufacturing a MEMS switch provided by an embodiment of the present disclosure.

Step 202, as shown in FIG. 12C, forming a second insulating layer 7;

The second insulating layer 7 completely covers the first surface 11 of the insulating substrate 1, a side surface 122 and the first region 121. Alternatively, the embodiment of the present disclosure is not limited thereto, and the second insulating layer 7 may completely cover the side surface 122 and the first region 121, but not cover the first surface 11 of the insulating substrate 1. Alternatively, the second insulating layer 7 may completely cover the first region 121, but not cover the first surface 11 of the insulating substrate 1 and the side surface 122. In addition, the second insulating layer 7 may alternatively be omitted.

Figure 12D:
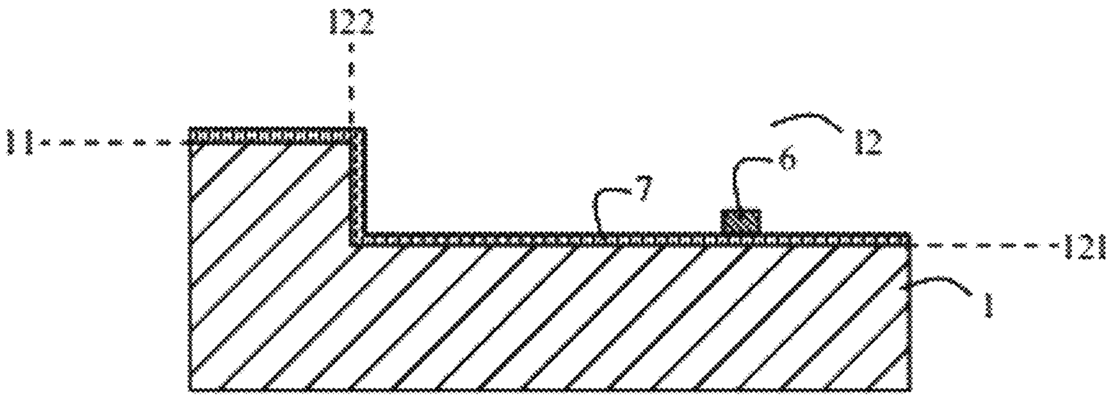
FIG. 12D shows step 203 in a second process diagram of a method of manufacturing a MEMS switch provided by an embodiment of the present disclosure.

Step 203, as shown in FIG. 12D, forming a touch point structure 6 on a surface of the second insulating layer 7 away from the insulating substrate 1;

If the second insulating layer 7 is not provided, then the touch point structure 6 is formed on the first region 121.

In step 203, a film layer of the touch point structure 6 may be prepared by CVD, and a pattern structure of the touch point structure 6, such as a convex part formed on the second insulating layer 7, may be prepared by photoresist coating, photolithography and etching.

Figure 12E:
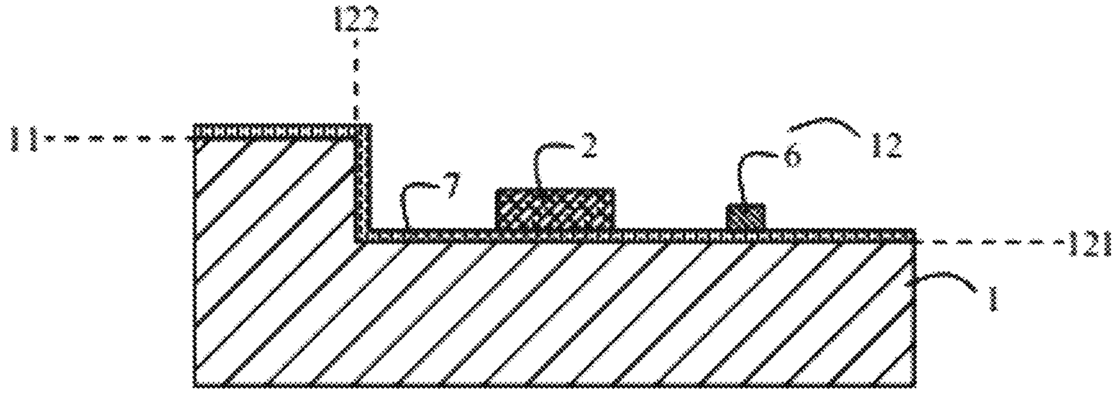
FIG. 12E shows step 204 in a second process diagram of a method of manufacturing a MEMS switch provided by an embodiment of the present disclosure.
Figure 12F:
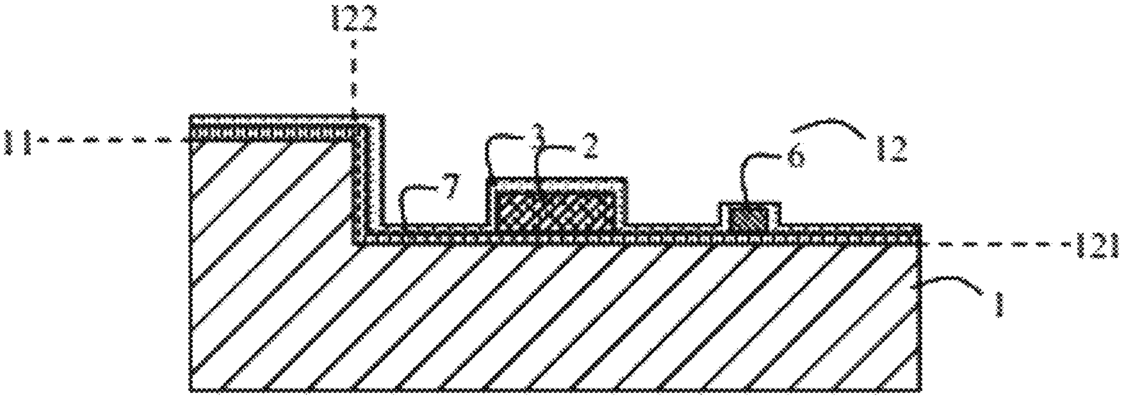
FIG. 12F shows step 205 in a second process diagram of a method of manufacturing a MEMS switch provided by an embodiment of the present disclosure.

Step 204, as shown in FIG. 12E, forming a driving electrode 2 on a surface of the second insulating layer 7 away from the insulating substrate 1;

Step 205, as shown in FIG. 12F, forming a first insulating layer 3, where the first insulating layer 3 completely covers the touch point structure 6 and the driving electrode 2, and completely covers an exposed region of the second insulating layer 7. The first insulating layer 3 is used to protect the driving electrode 2 and the touch point structure 6, and to improve the structural stability of the driving electrode 2 and the touch point structure 6.

If the second insulating layer 7 is not provided, then the first insulating layer 3 covers the exposed region in the first region 121, the side surface 122, and the first surface 11 of the insulating substrate 1. Alternatively, the embodiment of the present disclosure is not limited thereto, and the first insulating layer 3 may completely cover the side surface 122 and the first region 121, but not cover the first surface 11 of the insulating substrate 1. Alternatively, the first insulating layer 3 may completely cover the first region 121, but not cover the first surface 11 of the insulating substrate 1 and the side surface 122.

Figure 12G:
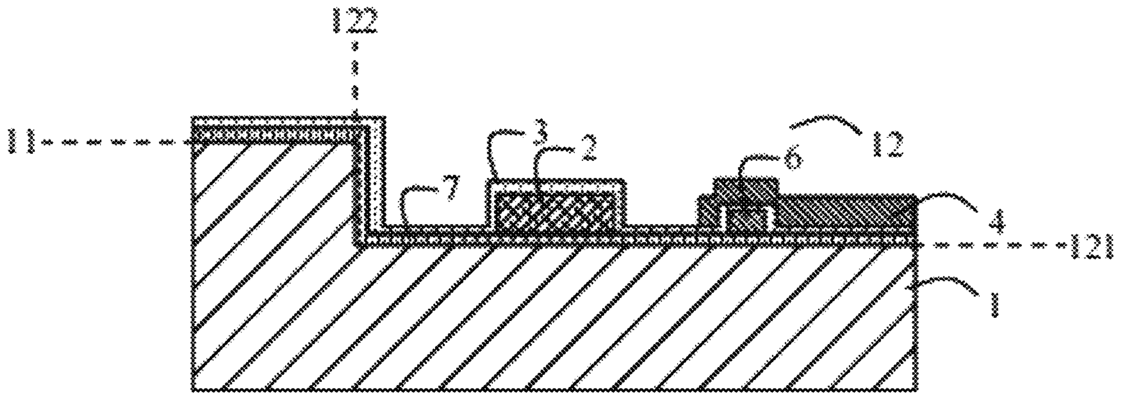
FIG. 12G shows step 206 in a second process diagram of a method of manufacturing a MEMS switch provided by an embodiment of the present disclosure.

Step 206, as shown in FIG. 12G, forming a first signal transmission line 4 is on a surface of the first insulating layer 3 away from the insulating substrate 1, where an orthographic projection of the first signal transmission line 4 on the first region 121 at least partially covers an orthographic projection of the touch point structure 6 on the first region 121, so that the first signal transmission line 4 forms a protrusion at a position corresponding to the touch point structure 6, thereby facilitating the touch between the first signal transmission line 4 and the cantilever segment 52. Alternatively, in practical applications, the orthographic projection of the first signal transmission line 4 on the first region 121 may partially cover the orthographic projection of the touch point structure 6 on the first region 121, as long as the first signal transmission line 4 may form a protrusion at the position corresponding to the touch point structure 6.

Figure 12H:
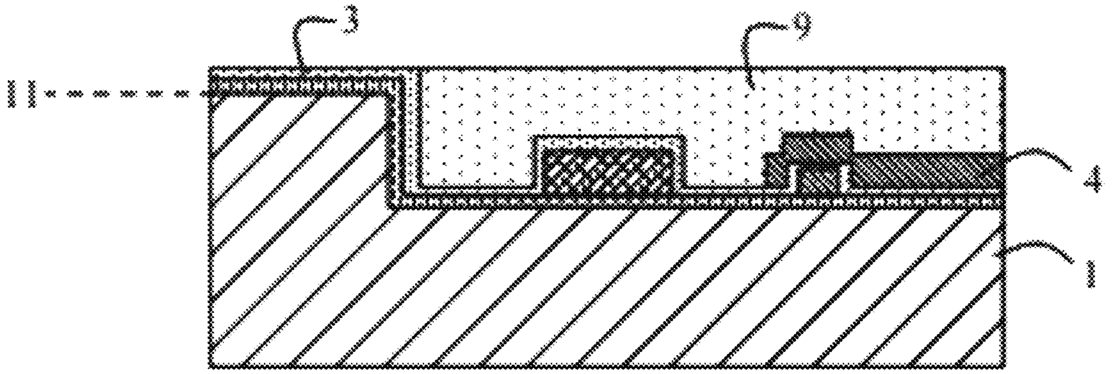
FIG. 12H shows step 207 in a second process diagram of a method of manufacturing a MEMS switch provided by an embodiment of the present disclosure.

Step 207, as shown in FIG. 12H, forming a sacrificial layer 9 on the first region 121, where a surface of the sacrificial layer 9 away from the first region 121 of the step structure 12 is flush with the first insulating layer 3;

The sacrificial layer 9 fills in the step structure 12, and may planarize the entire surface of the insulating substrate 1 (including the surface of the first insulating layer 3 away from the insulating substrate 1 and a surface of the sacrificial layer away from the first region 121), so that the signal transmission segment 51 and the cantilever segment 52 of the second signal transmission line 5, which are connected together as a one-piece member together, may be formed in a subsequent step.

Figure 12I:
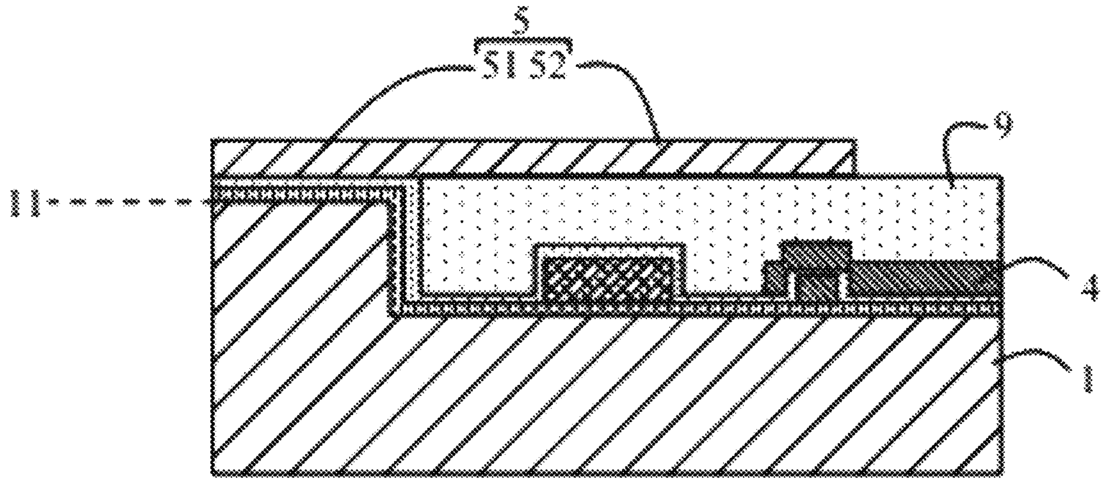
FIG. 12I shows step 208 in a second process diagram of a method of manufacturing a MEMS switch provided by an embodiment of the present disclosure.

Step 208, as shown in FIG. 12I, forming a second signal transmission line 5 on the surface of the first insulating layer 3 away from the insulating substrate 1 and the surface of the sacrificial layer 9 away from the first region 121, where the second signal transmission line 5 includes a signal transmission segment 51 and a cantilever segment 52 that are connected together as a one-piece member, the signal transmission segment 51 is disposed on the surface of the first insulating layer 3 away from the insulating substrate 1, and the cantilever segment 52 is disposed on the surface of the sacrificial layer 9 away from the first region 121.

Figure 12J:
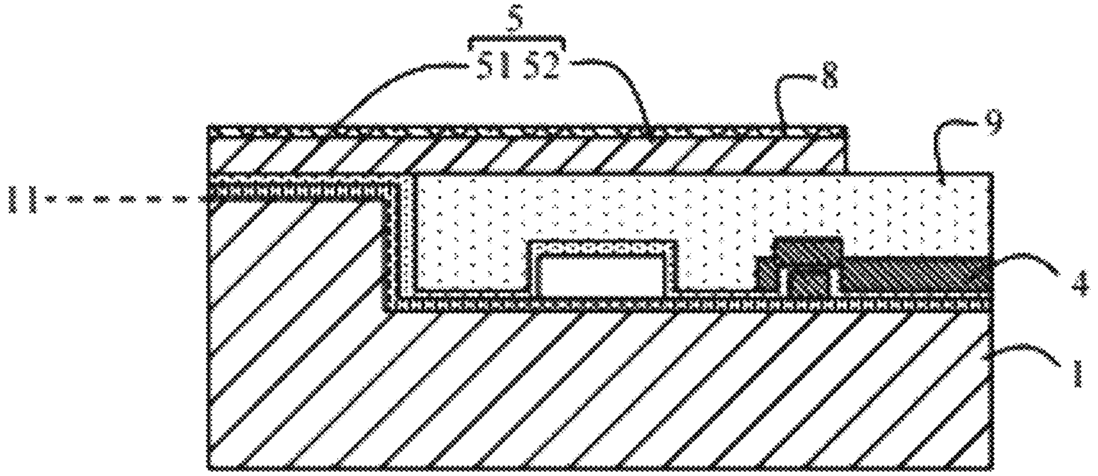
FIG. 12J shows step 209 in a second process diagram of a method of manufacturing a MEMS switch provided by an embodiment of the present disclosure.

Step 209, as shown in FIG. 12J, forming an elastic layer 8 on a surface of the signal transmission segment 51 away from the insulating substrate 1 and a surface of the cantilever segment 52 away from the insulating substrate 1;

By means of the elastic layer 8, the elastic coefficient of the cantilever segment 52 can be effectively improved. When the cantilever segment 52 bends downward, the cantilever segment 52 may be pulled upward by the tensile stress of the elastic layer 8, so that the adhesion between the first signal transmission line 4 and the cantilever segment 52 can be reduced, and the reliability of the MEMS switch can be improved.

It should be noted that, in practical applications, the elastic layer 8 may alternatively be disposed only on the surface of the cantilever segment 52 away from the insulating substrate 1, as long as the above function can be achieved, which is not particularly limited by the embodiment of the present disclosure.

Figure 12K:
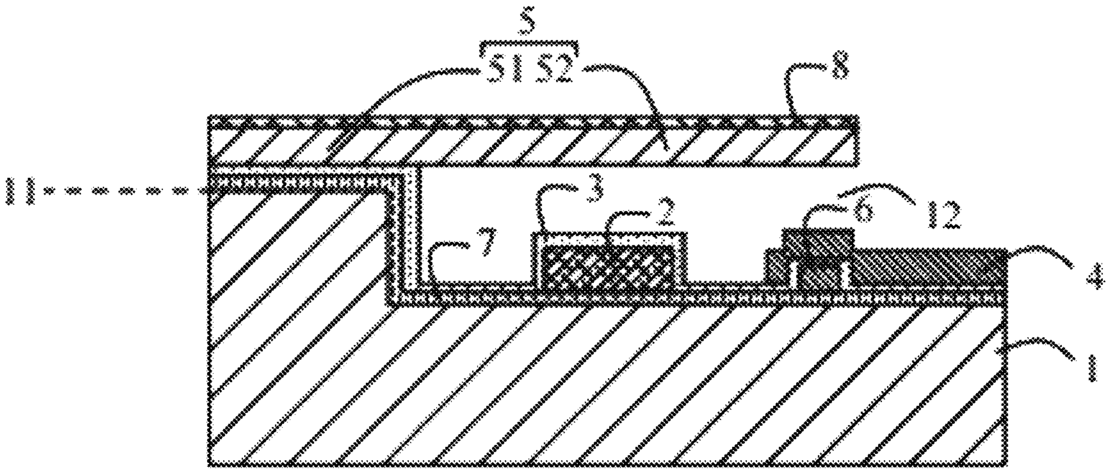
FIG. 12K shows step 210 in a second process diagram of a method of manufacturing a MEMS switch provided by an embodiment of the present disclosure.

Step 210, as shown in FIG. 12K, removing the sacrificial layer 9, so that the cantilever segment 52 is suspended on a side of the first signal transmission line 4 away from the touch point structure 6.

The method of manufacturing the MEMS switch shown in FIG. 11 is the same as the method of manufacturing the MEMS switch shown in FIG. 10, and therefore the detailed description is not repeated herein.

Figure 13:
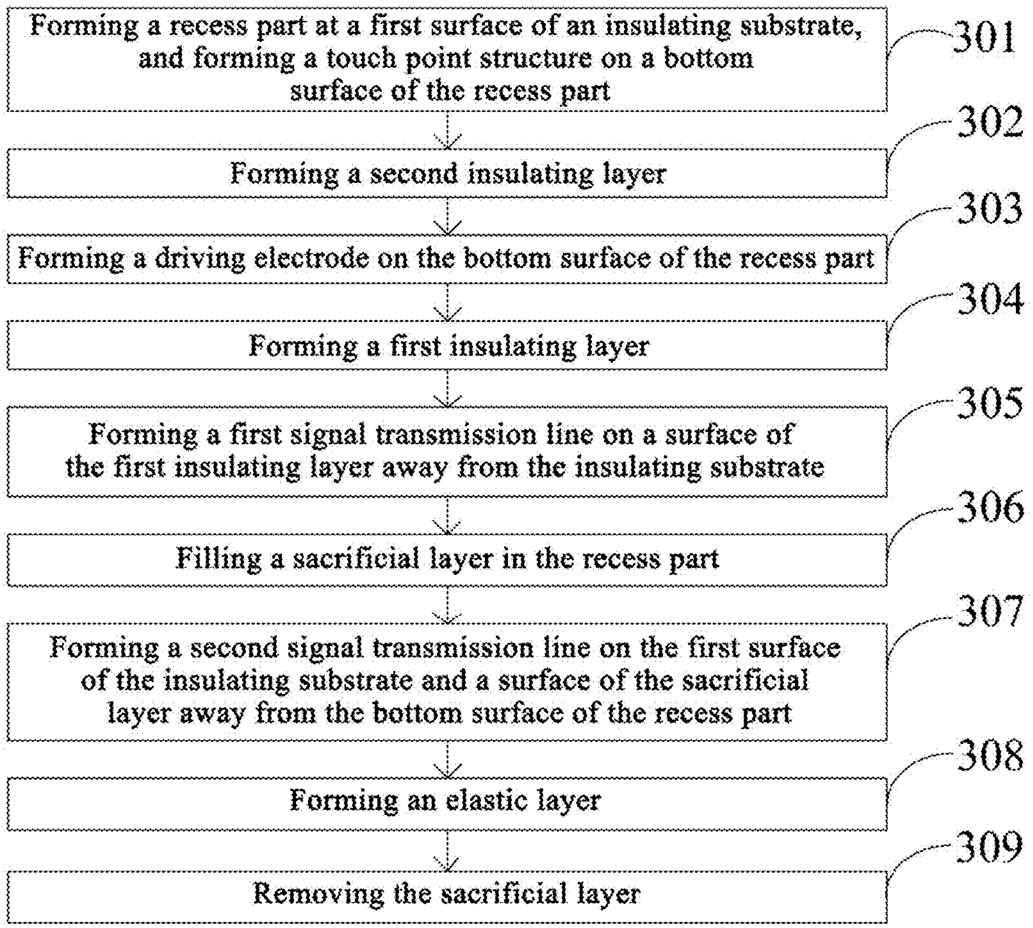
FIG. 13 is a third flowchart of a method of manufacturing a MEMS switch provided by an embodiment of the present disclosure.
Figure 14A:
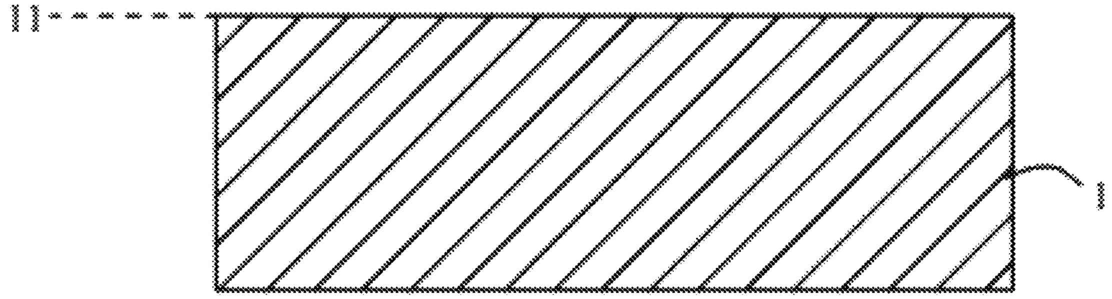
FIG. 14A shows an insulating substrate having a first surface.

On the basis of the method of manufacturing the MEMS switch shown in FIG. 11, the manufacturing method may be further modified. FIG. 13 is a third flowchart of a method of manufacturing a MEMS switch provided by an embodiment of the present disclosure. FIGS. 14A to 14J show a third process diagram of a method of manufacturing a MEMS switch provided by an embodiment of the present disclosure. Specifically, referring to FIGS. 13 and 14A, an insulating substrate 1 is provided. As shown in FIG. 14A, the insulating substrate 1 has a first surface 11.

The manufacturing method includes the following steps.

Figure 14B:
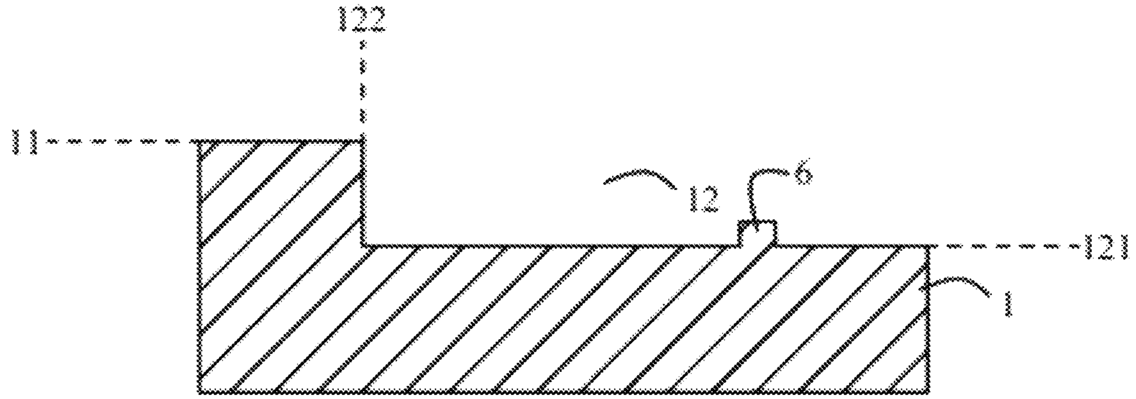
FIG. 14B shwos step 301 in a third process diagram of a method of manufacturing a MEMS switch provided by an embodiment of the present disclosure.

Step 301, as shown in FIG. 14B, forming a first region 121 at the first surface 11 of the insulating substrate 1, where the first region 121 is closer to the surface of the insulating substrate 1 away from the first surface 11, relative to the first surface 11. That is, there is a height difference between the first surface 1 (other regions except the first region 121) and the first region 121. A touch point structure 6 is formed in the first region 121. That is, the first region 121 and the touch point structure 6 are formed in a same step, and the touch point structure 6 and the insulating substrate 1 are connected together as a one-piece member.

Thus, the process steps can be further reduced, and the process complexity and the process cost can be reduced.

In some alternative embodiments, the first region 121 and the touch point structure 6 may be formed through etching using a laser etching method.

Figure 14C:
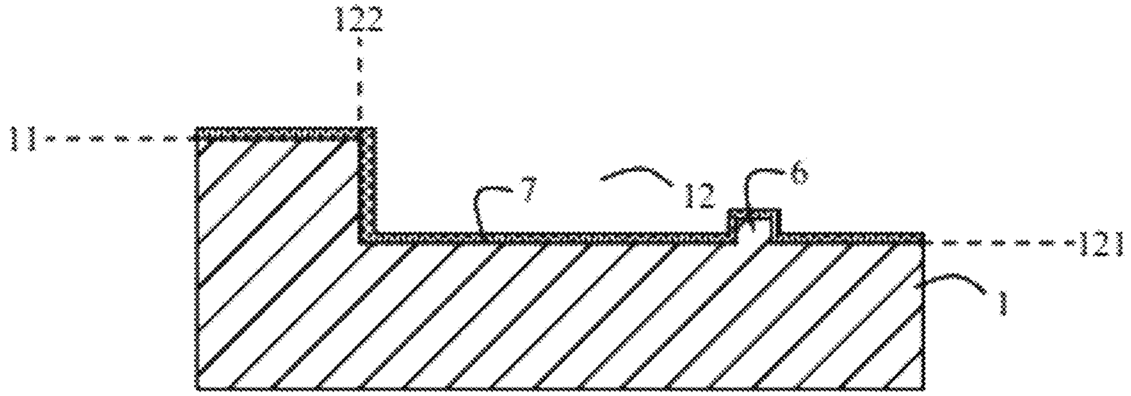
FIG. 14C shows step 302 in a third process diagram of a method of manufacturing a MEMS switch provided by an embodiment of the present disclosure.

Step 302, as shown in FIG. 14C, forming a second insulating layer 7;

In the case where the touch point structure 6 and the insulating substrate 1 are connected together as a one-piece member, the second insulating layer 7 covers the touch point structure 6.

Figure 14D:
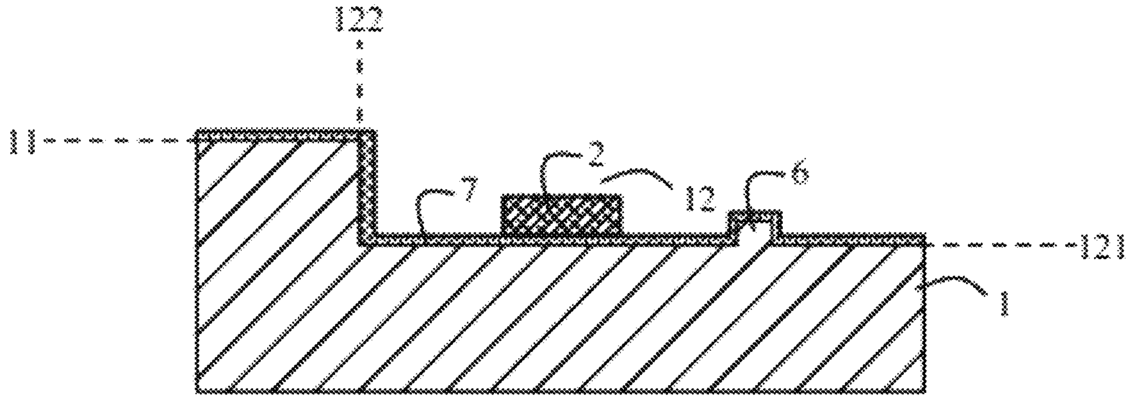
FIG. 14D shows step 303 in a third process diagram of a method of manufacturing a MEMS switch provided by an embodiment of the present disclosure.
Figure 14E:
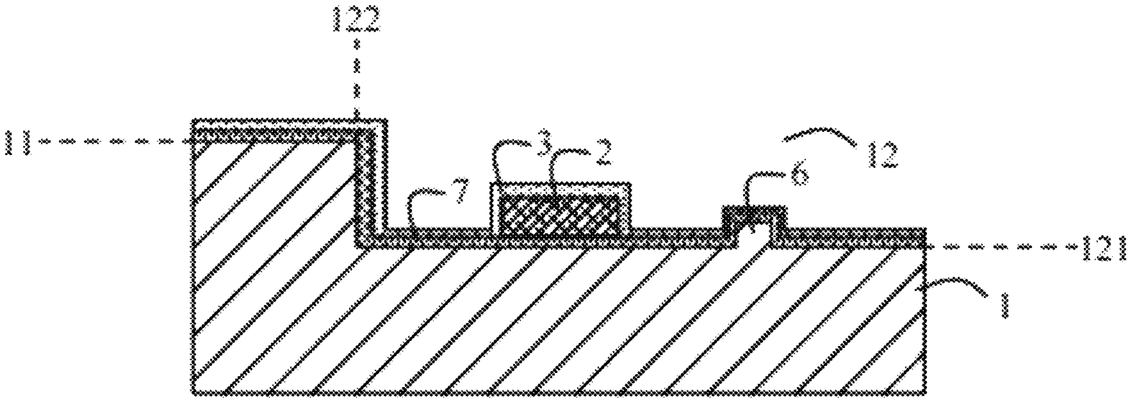
FIG. 14E shows step 304 in a third process diagram of a method of manufacturing a MEMS switch provided by an embodiment of the present disclosure.

Step 303, as shown in FIG. 14D, forming a driving electrode 2 on a surface of the second insulating layer 7 away from the insulating substrate 1;

Step 304, as shown in FIG. 14E, forming a first insulating layer 3, where the first insulating layer 3 completely covers the driving electrode 2, and completely covers an exposed region of the second insulating layer 7.

If the second insulating layer 7 is not provided, then the first insulating layer 3 completely covers the driving electrodes 2 and the touch point structures 6, as well as the exposed region in the first region 121, the side surface 122 and the first surface 11 of the insulating substrate 1. Alternatively, the embodiment of the present disclosure is not limited thereto, and the first insulating layer 3 may completely cover the side surface 122 and the first region 121, but not cover the first surface 11 of the insulating substrate 1. Alternatively, the first insulating layer 3 may completely cover the first region 121, but not cover the first surface 11 of the insulating substrate 1 and the side surface 122.

Figure 14F:
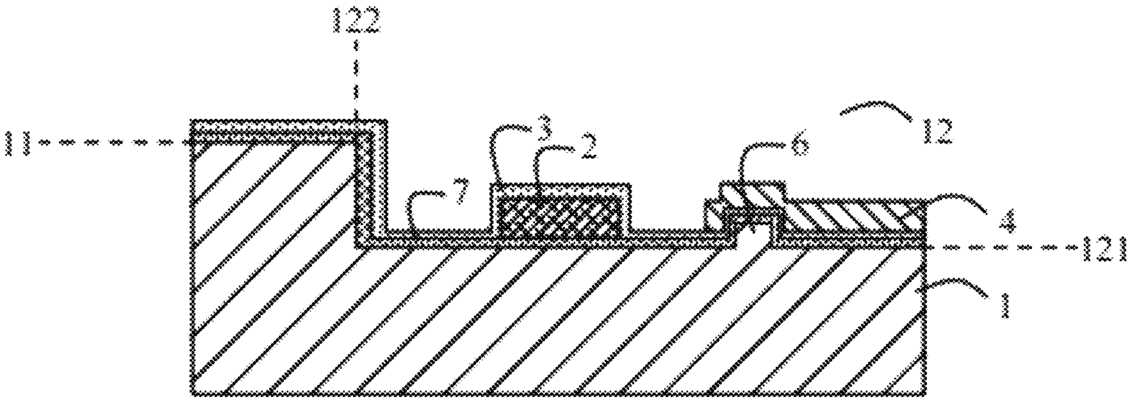
FIG. 14F shows step 305 in a third process diagram of a method of manufacturing a MEMS switch provided by an embodiment of the present disclosure.

Step 305, as shown in FIG. 14F, forming a first signal transmission line 4 on a surface of the first insulating layer 3 away from the insulating substrate 1, where an orthographic projection of the first signal transmission line 4 on the first region 121 at least partially covers an orthographic projection of the touch point structure 6 on the first region 121.

Figure 14G:
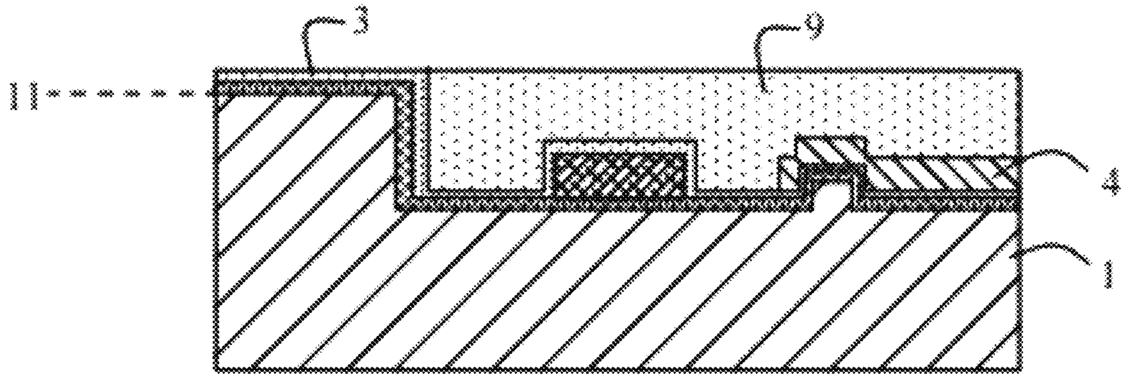
FIG. 14G shows step 306 in a third process diagram of a method of manufacturing a MEMS switch provided by an embodiment of the present disclosure.

Step 306, as shown in FIG. 14G, forming a sacrificial layer 9 on the first region 121, where a surface of the sacrificial layer 9 away from the first region 121 is flush with the first insulating layer 3.

Figure 14H:
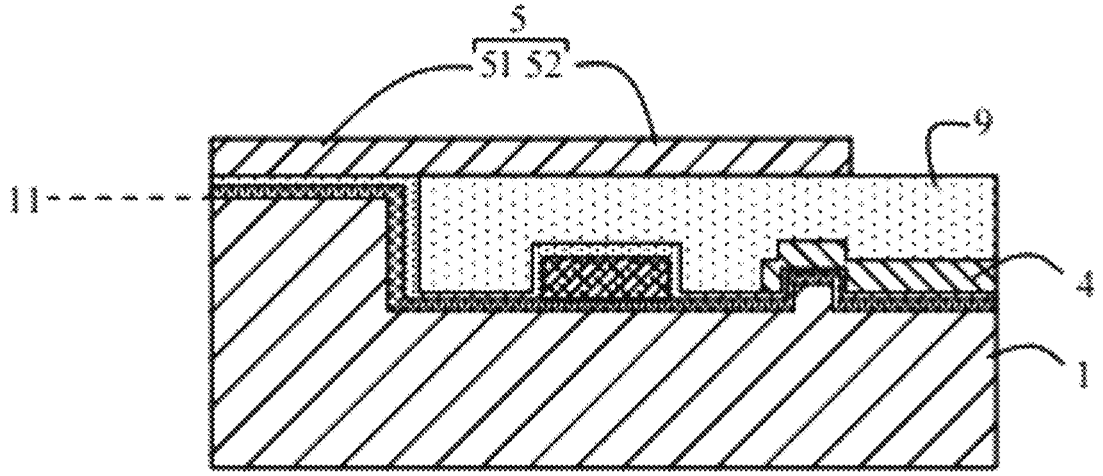
FIG. 14H shows step 307 in a third process diagram of a method of manufacturing a MEMS switch provided by an embodiment of the present disclosure.

Step 307, as shown in FIG. 14H, forming a second signal transmission line 5 on a surface of the first insulating layer 3 away from the insulating substrate 1 and a surface of the sacrificial layer 9 away from the first region 121, where the second signal transmission line 5 includes a signal transmission segment 51 and a cantilever segment 52 connected together as a one-piece member, the signal transmission segment 51 is disposed on the surface of the first insulating layer 3 away from the insulating substrate 1, and the cantilever segment 52 is disposed on the surface of the sacrificial layer 9 away from the first region 121.

Figure 14I:
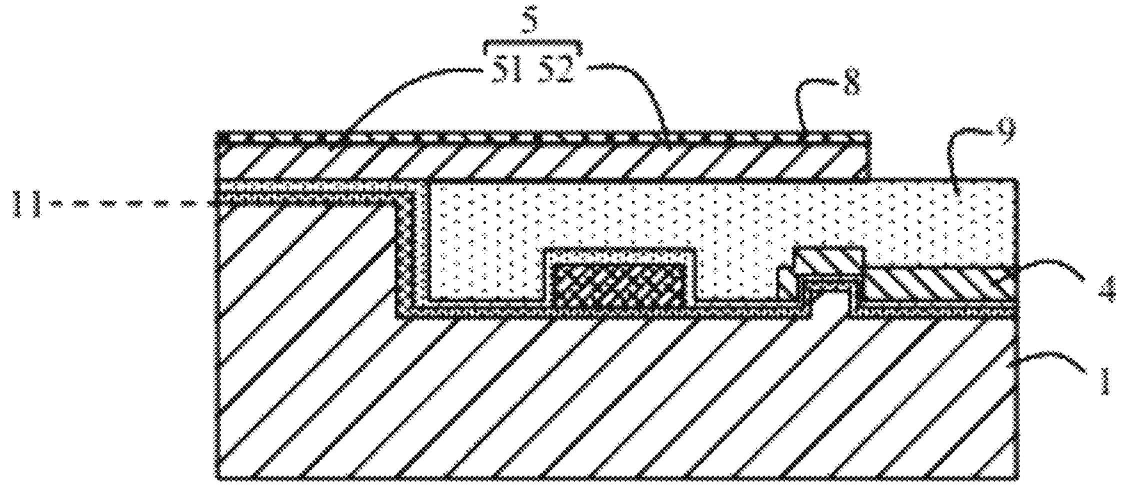
FIG. 14I shows step 308 in a third process diagram of a method of manufacturing a MEMS switch provided by an embodiment of the present disclosure.
Figure 14J:
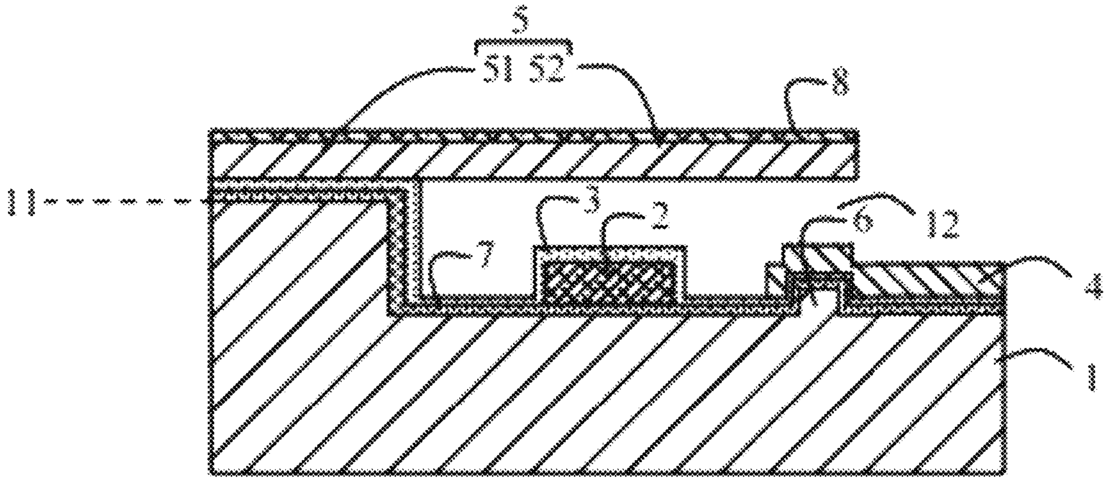
FIG. 14J shows step 309 in a third process diagram of a method of manufacturing a MEMS switch provided by an embodiment of the present disclosure.

Step 308, as shown in FIG. 14I, forming an elastic layer 8 on a surface of the signal transmission segment 51 away from the insulating substrate 1 and a surface of the cantilever segment 52 away from the insulating substrate 1;

Step 309, as shown in FIG. 14J, removing the sacrificial layer 9, so that the cantilever segment 52 is suspended on a side of the first signal transmission line 4 away from the touch point structure 6.

The method of manufacturing the MEMS switch shown in FIG. 13 is the same as the method of manufacturing the MEMS switch shown in FIG. 11, and therefore the detailed description is not repeated herein.

In summary, for the MEMS switch and the method of manufacturing the same provided by the embodiments of the present disclosure, compared with the prior art, an anchor point structure between the cantilever and the signal line and the preparation steps thereof are omitted, thereby not only simplifying the structure of the switch and reducing the complexity of the process, but also being able to reduce the impedance at the connection of the cantilever and the signal line (i.e., the cantilever segment 52 and the signal transmission segment 51), and to reduce the loss and distortion of the signal during transmission, and the signal transmission segment 51 and the cantilever segment 52 connected together as a one-piece member have stronger bonding force, thereby reducing the probability of deformation and breakage of the cantilever, and improving the reliability of the cantilever.

It will be understood that the above embodiments are merely exemplary embodiments adopted to illustrate the principles of the present disclosure, and the present disclosure is not limited thereto. It will be apparent to one of ordinary skill in the art that various modifications and improvements can be made without departing from the spirit and scope of the present disclosure, and such modifications and improvements are also considered to be within the scope of the present disclosure.

What is claimed is:

1. A MEMS switch, comprising an insulating substrate, a driving electrode, a first insulating layer, a first signal transmission line and a second signal transmission line, wherein a first surface of the insulating substrate is provided with a first region, the first region is closer to a surface of the insulating substrate away from the first surface, relative to the first surface, and the driving electrode is on the first region;

the first insulating layer completely covers the driving electrode;

the first signal transmission line is on a surface of the first insulating layer away from the insulating substrate; and the second signal transmission line comprises a signal transmission segment and a cantilever segment connected together as a one-piece member, wherein the signal transmission segment is on the first surface of the insulating substrate, and the cantilever segment is suspended on a side of the first signal transmission line away from the insulating substrate.

2. The MEMS switch according to claim 1, wherein a surface of the signal transmission segment close to the insulating substrate and a surface of the cantilever segment close to the insulating substrate are flush with each other, and a thickness of the signal transmission segment is the same as a thickness of the cantilever segment.

3. The MEMS switch according to claim 1, wherein the insulating substrate comprises a glass substrate.

4. The MEMS switch according to claim 1, further comprising a touch point structure on the first region, wherein the first insulating layer completely covers the touch point structure, and an orthographic projection of the first signal transmission line on the first region at least partially covers an orthographic projection of the touch point structure on the first region.

5. The MEMS switch according to claim 4, wherein the touch point structure and the insulating substrate are connected together as a one-piece member.

6. The MEMS switch according to claim 1, wherein the first insulating layer further covers the first surface of the insulating substrate, a side surface connected between the first region and the first surface, and an exposed region in the first region, and the first insulating layer is on a side of the signal transmission segment close to the insulating substrate; or the first insulating layer further covers the side surface and the exposed region in the first region; or the first insulating layer further covers the exposed region in the first region.

7. The MEMS switch according to claim 1, further comprising a second insulating layer disposed on the first region, wherein the driving electrode is on a surface of the second insulating layer away from the insulating substrate; and the first insulating layer is on a side of the second insulating layer away from the insulating substrate.

8. The MEMS switch according to claim 7, wherein the second insulating layer completely covers the first surface of the insulating substrate, a side surface connected between the first region and the first surface, and the first region, and the second insulating layer is on a side of the signal transmission segment close to the insulating substrate; or the second insulating layer completely covers the side surface and the first region; or the second insulating layer completely covers the first region.

9. The MEMS switch according to claim 1, further comprising an elastic layer, wherein the elastic layer is on a surface of the signal transmission segment away from the insulating substrate and a surface of the cantilever segment away from the insulating substrate; or the elastic layer is on the surface of the cantilever segment away from the insulating substrate.

10. The MEMS switch according to claim 9, wherein the elastic layer comprises graphene.

11. The MEMS switch according to claim 1, wherein the cantilever segment is provided with a plurality of through holes penetrating through the cantilever segment in a thickness direction of the cantilever segment.

12. A method of manufacturing a MEMS switch, comprising:

forming a first region at a first surface of an insulating substrate, remaining the first surface except the first region, wherein the first region is closer to a surface of the insulating substrate away from the first surface, relative to the first surface;

forming a driving electrode on the first region;

forming a first insulating layer, wherein the first insulating layer completely covers the driving electrode;

forming a first signal transmission line on a surface of the first insulating layer away from the insulating substrate;

forming a sacrificial layer on the first region, wherein a surface of the sacrificial layer away from the first region and the first surface of the insulating substrate are flush with each other;

forming a second signal transmission line on the first surface of the insulating substrate and the surface of the sacrificial layer away from the first region, wherein the second signal transmission line comprises a signal transmission segment and a cantilever segment connected together as a one-piece member, the signal transmission segment is on the first surface of the insulating substrate, and the cantilever segment is on the surface of the sacrificial layer away from the first region; and removing the sacrificial layer, such that the cantilever segment is suspended on a side of the first signal transmission line away from the insulating substrate.

13. The method of manufacturing a MEMS switch according to claim 12, wherein before the forming the driving electrode on the first region, the method further comprises:

forming a touch point structure on the first region;

wherein the first region and the touch point structure are formed in a same step; or the first region and the touch point structure are formed successively in two steps;

in the forming the first insulating layer, the first insulating layer completely covers the touch point structure; and in the forming the first signal transmission line, an orthographic projection of the first signal transmission line on the first region at least partially covers an orthographic projection of the touch point structure on the first region.

14. The method of manufacturing a MEMS switch according to claim 13, wherein when forming the first region and the touch point structure in the same step, the first region and the touch point structure are formed through etching using a laser etching method.

15. The method of manufacturing a MEMS switch according to claim 12, wherein after the forming the first region at the first surface of the insulating substrate and before the forming the driving electrode on the first region, the method further comprises:

forming a second insulating layer;

wherein the second insulating layer completely covers the first surface of the insulating substrate, a side surface connected between the first region and the first surface, and the first region; or the second insulating layer completely covers the side surface and the first region; or the second insulating layer completely covers the first region.

16. The method of manufacturing a MEMS switch according to claim 12, wherein the sacrificial layer is removed by plasma etching or acid-base etching.

17. The method of manufacturing a MEMS switch according to claim 12, wherein after the forming the second signal transmission line and before the removing the sacrificial layer, the method further comprises:

forming an elastic layer on a surface of the signal transmission segment away from the insulating substrate and a surface of the cantilever segment away from the insulating substrate; or forming the elastic layer on the surface of the cantilever segment away from the insulating substrate.

18. The method of manufacturing a MEMS switch according to claim 13, wherein after the forming the first region at the first surface of the insulating substrate and before the forming the driving electrode on the first region, the method further comprises:

forming a second insulating layer;

wherein the second insulating layer completely covers the first surface of the insulating substrate, a side surface connected between the first region and the first surface, and the first region; or the second insulating layer completely covers the side surface and the first region; or the second insulating layer completely covers the first region.

19. The method of manufacturing a MEMS switch according to claim 14, wherein after the forming the first region at the first surface of the insulating substrate and before the forming the driving electrode on the first region, the method further comprises:

forming a second insulating layer;

wherein the second insulating layer completely covers the first surface of the insulating substrate, a side surface connected between the first region and the first surface, and the first region; or the second insulating layer completely covers the side surface and the first region; or the second insulating layer completely covers the first region.

20. The MEMS switch according to claim 11, wherein the plurality of through holes are in an array.

* * * * *